(12) United States Patent
Matejka et al.

(10) Patent No.: US 11,237,185 B2
(45) Date of Patent: Feb. 1, 2022

(54) APPARATUS AND METHOD FOR A SCANNING PROBE MICROSCOPE

(71) Applicant: Carl Zeiss SMT GmbH, Oberkochen (DE)

(72) Inventors: Ulrich Matejka, Jena (DE); Christof Baur, Darmstadt (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 0 days.

(21) Appl. No.: 16/586,239

(22) Filed: Sep. 27, 2019

(65) Prior Publication Data

US 2020/0025796 A1 Jan. 23, 2020

Related U.S. Application Data

(63) Continuation of application No. PCT/EP2018/055282, filed on Mar. 5, 2018.

(30) Foreign Application Priority Data

Mar. 31, 2017 (DE) .......................... 102017205528.6

(51) Int. Cl.
*G01Q 20/02* (2010.01)
*G01Q 10/06* (2010.01)
(Continued)

(52) U.S. Cl.
CPC .......... *G01Q 20/02* (2013.01); *G01Q 10/065* (2013.01); *G01Q 40/02* (2013.01); *G01Q 10/045* (2013.01); *G01Q 70/08* (2013.01)

(58) Field of Classification Search
CPC ...... G01G 20/02; G01G 10/065; G01G 40/02; G01G 10/045; G01G 70/08
See application file for complete search history.

(56) References Cited

U.S. PATENT DOCUMENTS 6,298,715 B1 * 10/2001 Thomson ............... G01Q 20/02
                                                    73/105
6,580,677 B1   6/2003 Chiba et al.
(Continued)

FOREIGN PATENT DOCUMENTS

EP    2 913 681      9/2015 ............ G01Q 10/04
JP    S 58-100703    6/1983 ............ G01B 11/02
(Continued)

OTHER PUBLICATIONS

The Japanese Office Action for Japanese Application No. JP 2019-553808, dated Sep. 28, 2020 (with English Translation).
(Continued)

*Primary Examiner* — Wyatt A Stoffa
(74) *Attorney, Agent, or Firm* — Fish & Richardson P.C.

(57) ABSTRACT

The present application relates to an apparatus for a scanning probe microscope, said apparatus having: (a) at least one first measuring probe having at least one first cantilever, the free end of which has a first measuring tip; (b) at least one first reflective area arranged in the region of the free end of the at least one first cantilever and embodied to reflect at least two light beams in different directions; and (c) at least two first interferometers embodied to use the at least two light beams reflected by the at least one first reflective area to determine the position of the first measuring tip.

18 Claims, 16 Drawing Sheets

(51) Int. Cl.
*G01Q 40/02* (2010.01)
*G01Q 10/04* (2010.01)
*G01Q 70/08* (2010.01)

(56) References Cited

U.S. PATENT DOCUMENTS

| | | | | |
|---|---|---|---|---|
| 2005/0117163 | A1 | 6/2005 | Ng et al. | |
| 2005/0194534 | A1* | 9/2005 | Kneedler | G01Q 30/04 250/307 |
| 2008/0307865 | A1* | 12/2008 | Degertekin | G01Q 60/38 73/105 |
| 2009/0027690 | A1* | 1/2009 | Fukuzawa | G01Q 20/02 356/600 |
| 2009/0212215 | A1 | 8/2009 | Nagatomo et al. | |
| 2015/0020244 | A1* | 1/2015 | Humphris | G01Q 10/045 850/6 |
| 2015/0285836 | A1* | 10/2015 | Humphris | G01Q 10/00 850/1 |
| 2017/0016932 | A1* | 1/2017 | Humphris | G01Q 10/045 |

FOREIGN PATENT DOCUMENTS

| | | | |
|---|---|---|---|
| JP | H06-289036 | 10/1994 | ............ G01N 37/00 |
| JP | H 06-294638 | 10/1994 | ............ G01B 11/30 |
| JP | H06-294638 | 10/1994 | ............ G01B 11/30 |
| JP | H06294638 A * | 10/1994 | |
| JP | H09-218211 | 8/1997 | ............ G01N 37/00 |
| JP | H 11-118858 | 4/1999 | ............ G01R 29/12 |
| JP | 2000-030306 | 1/2000 | ............ G11B 7/24 |
| JP | 2000258331 A * | 9/2000 | |
| JP | 2002-168754 | 6/2002 | ............ G01N 13/10 |
| JP | 2008-134254 | 6/2008 | ............ G01N 13/10 |
| KR | 1020080110234 | 12/2008 | ............ G01N 13/16 |
| WO | WO 00/19166 | 4/2000 | ............ G01B 5/28 |
| WO | WO 01/46643 | 6/2001 | ............ G01B 5/28 |
| WO | WO 2012/104625 | 9/2012 | ............ G01Q 10/06 |
| WO | WO 2015/011448 | 1/2015 | ............ G01Q 10/06 |

OTHER PUBLICATIONS

The German Office Action for German Application No. DE 10 2017 205 528.6 by Dr. Christian Keller dated Nov. 23, 2017.
The Taiwan Office Action for Taiwan Application No. TW 107109097 dated Jan. 17, 2019.
The Taiwan Search Report for Taiwan Application No. TW 107109097 dated Jan. 14, 2019.
The International Search Report and Written Opinion of the International Searching Authority for International Application No. PCT/EP2018/055282, dated Jul. 13, 2018.
Dienwiebel et al., "Design and performance of a high-resolution frictional force microscope with quantitative three-dimensional force sensitivity," *Review of Scientific Instruments*, vol. 76, pp. 043704-1-043704-7 (2005).
Dienwiebel et al., "Superlubricity of graphite," *Physical Review Letters*, vol. 92, No. 12, pp. 126101-1-126101-4 (2004).
Hausotte et al., "Dimensional metrology in the macroscopic range with sub-nanometre resolution," *Institution of Mechanical Engineers, Journal of Engineering Manufacture*, vol. 227, No. 5, pp. 657-661 (2013).
Humphris et al., "High speed nano-metrology," *Review Scientific Instruments*, vol. 82, pp. 043710-1-043710-5 (2011).
Zijlstra et al., "Fabrication of a novel scanning probe device for quantitative nanotribology," *Sensors and Actuators*, vol. 84, pp. 18-24 (2000).

* cited by examiner

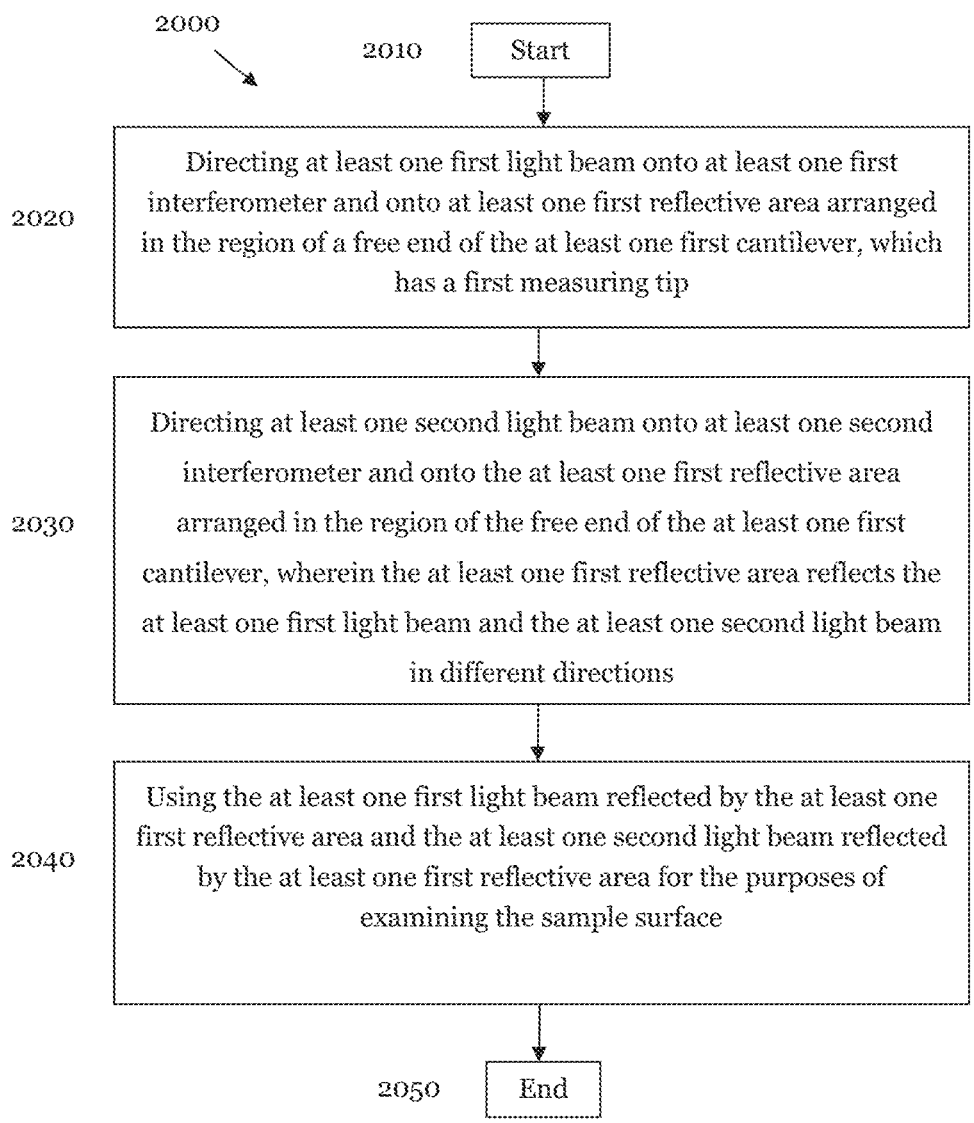

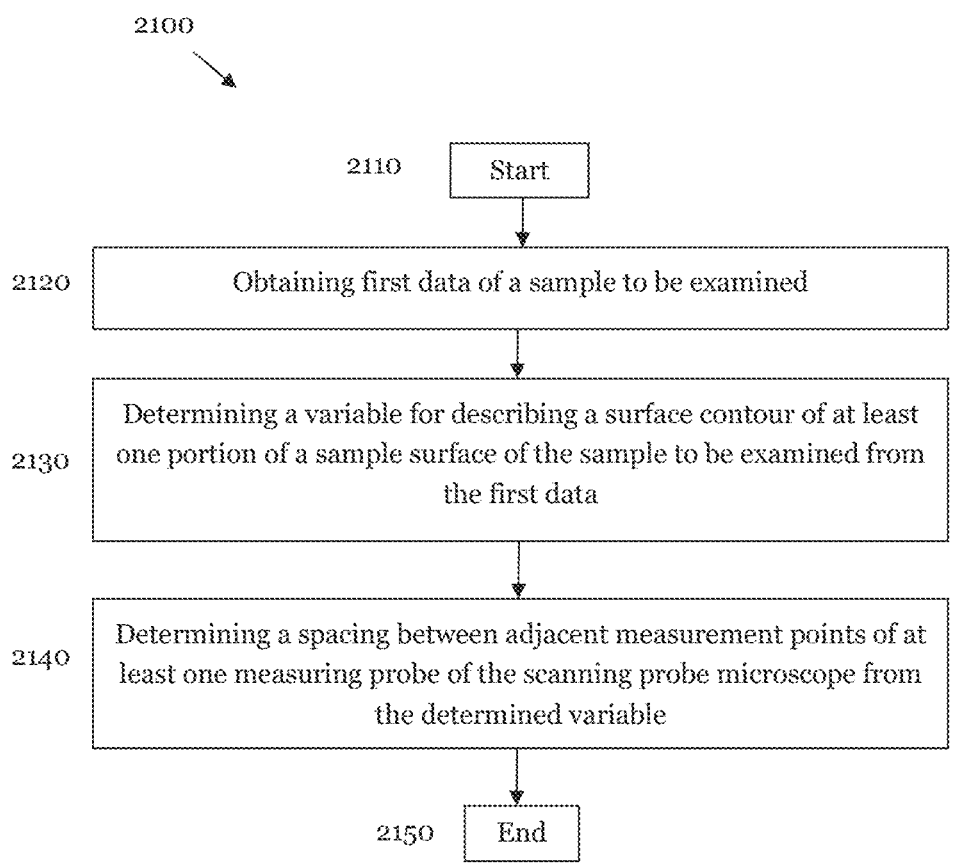

APPARATUS AND METHOD FOR A SCANNING PROBE MICROSCOPE

CROSS-REFERENCE TO RELATED APPLICATIONS

This application is a continuation of and claims priority under 35 U.S.C. § 120 from PCT Application No. PCT/EP2018/055282, filed on Mar. 5, 2018, which claims priority from German Application No. DE 10 2017 205 528.6, filed on Mar. 31, 2017. The entire contents of each of the above priority applications are incorporated herein by reference.

TECHNICAL FIELD

The present invention relates to an apparatus and a method for a scanning probe microscope.

BACKGROUND

Scanning probe microscopes use a measuring probe to scan a sample or the surface thereof and thus yield measurement data for producing a representation of the topography of the sample surface. Scanning probe microscopes are abbreviated hereinafter to SPM. Different SPM types are differentiated depending on the type of interaction between the measuring tip of a measuring probe and the sample surface. Use is often made of scanning tunneling microscopes (STM), in which a voltage is applied between the sample and the measuring tip, which do not touch one another, and the resulting tunneling current is measured.

In the microscope referred to as atomic force microscope (AFM) or scanning force microscope (SFM), the measuring tip is deflected by atomic forces of the sample surface, typically attractive van der Waals forces and/or repulsive forces of the exchange interaction. The deflection of the measuring tip is proportional to the force acting between the measuring tip and the sample surface, and this force is used to determine the surface topography.

In addition to these conventional SPM types, there are a multiplicity of further appliance types which are used for specific fields of application, such as e.g. magnetic force microscopes or optical and acoustic near-field scanning microscopes.

Scanning probe microscopes are able to scan sample surfaces with a resolution of <1 nm in the z-direction, i.e. perpendicular to the sample surface, and with a lateral resolution, i.e. in the plane of the sample surface, in the region of 1 nm. Consequently, SPMs are promising measuring appliances for many fields of microtechnology and nanotechnology.

However, there are a few grave disadvantages with the aforementioned possibilities of SPMs. A conspicuous disadvantage of scanning probe microscopes lies in the low imaging speed caused by the recording of the individual data points in series and the mechanical movement of the measuring probe. A further point with a disadvantageous effect is found in the frequently indirect measurement of the local sample height, which limits the speed of the measurement data record. Typically, a measuring probe has a cantilever, from the tip of which a laser beam is reflected onto a four-quadrant photodiode that measures bending of the cantilever. The signal of the four-quadrant photodiode serves as a controlled variable for a closed loop. This control loop updates the movement of a piezoelectric actuator until the bending of the cantilever once again corresponds to the predetermined initial value. The height of the sample surface is determined from the movement of the piezoelectric actuator.

Often, the cantilever is additionally made to vibrate at high frequencies with an amplitude of a few 10 nm. The excitation frequency for the cantilever usually corresponds to the natural frequency thereof (e.g. 600 kHz) or lies in the vicinity of the latter.

The bandwidth of a closed-control for the z-distance between the measuring probe and sample surface is currently restricted to the single-digit kilohertz range for both modes of operation of the cantilever if there should be no artefacts, or only few artefacts, when recording the data.

In the article "High speed nano-metrology," Rev. Sci. Instr., Vol. 82, 043710-1 to 043710-5 (2011), the authors A. D. L. Humphris et al. describe a novel approach for an atomic force microscope (AFM) in which the deflection of the cantilever of the AFM in the z-direction, i.e. perpendicular to the sample surface, is not measured by an optical pointer system operated in a feedback loop, but by an interferometer radiating onto the rear side of the cantilever.

WO 2012/104625 A1 and WO 2015/011148 A1 describe scanning probe microscopes which are operated in a dynamic mode of operation and in which the distance of the measuring tip from the sample surface is measured with the aid of an interferometer.

In the article "Superlubricity of graphite," Phys. Rev. Lett., Vol. 92, No. 12, p. 126101-1 to 126101-4, the authors M. Dienwiebel et al. describe the structure of a frictional force microscope (FFM) and examinations carried out on graphite using the latter.

In the article "Fabrication of a novel scanning probe device for quantitative nanotribology," Sensors and Actuators, Vol. 84 (2000), p. 18-24, the authors T. Zijlstra et al. describe in detail the production of the frictional force sensor ("tribolever") for a frictional force microscope described in the preceding paragraph.

Despite the above-listed efforts in respect of increasing the imaging speed of scanning probe microscopes, these appliances still have space for improvements in respect of the resolution and the data recording speed.

The present invention therefore addresses the problem of specifying an apparatus and a method that can be used to increase the accuracy of measurement data of scanning probe microscopes and the recording speed thereof.

SUMMARY

In accordance with one exemplary embodiment of the present invention, this problem is solved by an apparatus for a scanning probe microscope, in which the apparatus comprises: (a) at least one first measuring probe having at least one first cantilever, the free end of which has a first measuring tip; (b) at least one first reflective area arranged in the region of the free end of the at least one first cantilever and embodied to reflect at least two light beams in different directions; and (c) at least two first interferometers embodied to use the at least two light beams reflected by the at least one first reflective area to determine the position of the first measuring tip.

A reflective area according to the invention is attached in the region of the free end of a cantilever, in which the latter also has a measuring tip. By virtue of at least two or more light beams from two or more interferometers radiating onto a reflective area according to the invention and said light beams being reflected by the latter, the position of the measuring tip may be determined directly in two or more dimensions. Since measurements for determining the position of the measuring tip of the measuring probe are carried out in the direct vicinity of the measuring tip, the position is determined with a very high accuracy, i.e. with sub-nanometer precision for all three spatial directions. Carrying out the measurements for all three spatial directions with the aid of interferometers moreover avoids the problems with speed that occur when a predetermined spacing between the measuring tip of the measuring probe and the sample surface is controlled in a closed loop.

An apparatus according to the invention may be installed in all types of scanning probe microscopes that have a spring beam or a cantilever. Further, the apparatus defined above may be used for scanning all types of samples. The use thereof for measurement problems in the fields of semiconductor technology and/or photolithographic masks is particularly advantageous.

An apparatus according to the invention may be used to determine the position of a measuring tip, independently of the manner in which a scanning probe microscope operates a measuring probe. This means that an apparatus according to the invention can be used, for example, in the contact mode, in which the measuring probe is scanned over the sample surface in an exposed state on the sample surface, and in the non-contact mode, in which the measuring probe is made to vibrate and scanned over the sample surface at a defined spacing therefrom. Further, in an apparatus according to the invention, the position of the measuring tip may be used in an intermittent mode of operation, in which the vibrating measuring tip reaches the sample surface during a small part of a vibration period, and in a scanning mode of operation or a step-in scanning mode.

Moreover, an above-defined apparatus can be used in any operating environment, i.e. the measuring probe of the scanning probe microscope can be operated in a vacuum, in a protective gas atmosphere, for example in nitrogen, in reactive surroundings, for instance in oxygen surroundings, in liquids or at ambient conditions.

Moreover, the apparatus explained above may be combined with any currently known cantilever drive, such as e.g. a piezo-actuator, a thermal actuator, an electrostatic actuator or a magnetic actuator. Moreover, an apparatus according to the invention may use all currently known measuring tips for scanning a sample surface.

The at least one first reflective area may be arranged on a side, opposite the first measuring tip, of the at least one first cantilever.

As a result, attaching a reflective area onto a cantilever of a measuring probe requires no significant change of the cantilever and therefore does not cause a drastic change in the operating behaviour of the measuring probe.

The at least one first reflective area may be embodied to reflect at least two light beams directed from different directions onto the first measuring tip onto themselves, i.e. substantially in an antiparallel direction. Further, the at least one first reflective area may be embodied to reflect at least one first light beam like a mirror and, for at least one second light beam incident in an angular range about an angle of an order of diffraction on the at least one first reflective area, produce a diffractive light beam occurring in this angular range. This angular range may comprise 0° to 20°, preferably 0° to 15°, more preferably 0° to 10°, and most preferably 0° to 5°.

The at least one first reflective area can comprise at least one first reflective portion and at least one second reflective portion, and the first reflective portion and the second reflective portion are not arranged in a plane.

A first reflective portion is preferably attached to the upper side of the cantilever and it reflects a light beam in the z-direction, i.e. perpendicular to the sample surface. A second reflective portion and optionally a third reflective portion reflect light beams directed obliquely onto the measuring tip of the cantilever. The second reflected light beam and optionally the third reflected light beam contain lateral position components, i.e. components in the x- and/or y-direction. As a result of this, in addition to the z-position (through the first reflective portion), it is possible to determine the position of the measuring tip in the three spatial directions from the light beams reflected at the second reflective portion and/or the third reflective portion. If two light beams are used, the position of the measuring tip can be determined in two spatial directions. By way of example, this is expedient if only the x- and z-coordinates of the measuring tip need to be measured very accurately. By way of example, such a measuring problem occurs when measuring line structures on a semiconductor chip. If use is made of three light beams, a corresponding reflective area and three interferometers, it is possible to ascertain the position of the measuring tip in three spatial directions. If the exact position and length of the measuring tip of the cantilever are unknown, these may be determined with the aid of a calibration measurement.

The reflecting portions may be embodied in the form of mirroring plane areas. However, it is also possible to embody the reflective portions as imaging optical elements that have curved reflective surfaces.

The reflective portions are preferably produced during the production process of the cantilever. In this case, the reflective portions are an integral constituent part of the cantilever of the measuring probe. For the purposes of increasing their reflectivity, the reflective portions may be coated with a metal layer, for example an aluminium layer or a gold layer, or a dielectric reflection layer. In another embodiment, the reflective portions may also be produced individually and fastened to a cantilever.

The at least one second reflective portion can be arranged tilted by an angle $\beta$ in relation to the at least one first reflective portion and/or the at least one second reflective portion can be rotated through an angle $\alpha$ relative to a longitudinal axis of the cantilever. The absolute value of the angle $\alpha$ may comprise a range from 0° to 90°, preferably 15° to 75°, more preferably 30° to 60°, and most preferably 40° to 50°, and the angle $\beta$ may comprise a range from 10° to 80°, preferably 20° to 70°, more preferably 30° to 60°, and most preferably 40° to 50°.

The at least one first reflective area may have at least one first reflective portion, at least one second reflective portion and at least one third reflective portion, the at least one first reflective portion may be arranged on the upper side of the cantilever, the at least one second reflective portion may have an angle $\alpha=+45°$ and an angle $\beta=+45°$, and the at least one third reflective portion may have an angle $\alpha=-45°$ and an angle $\beta=+45°$. Further, the at least two first interferometers may comprise at least three first interferometers embodied to use the at least three light beams reflected by the at least one first reflective portion, the at least one second reflective portion, and the at least one third reflective portion for the purposes of determining the position of the first measuring tip.

Further, the apparatus may comprise an objective through which the at least two light beams incident on the at least one reflective area and the at least two reflected light beams pass. The objective may have a numerical aperture (NA)>0.6, preferably >0.7, more preferably >0.8, and most preferably >0.9. In general, the following condition applies for the NA of the objective: $NA_{Objective} > \sin(\beta)$. By way of example, for $\beta=45°$, this means that $NA_{Objective} > 0.75$ must apply.

The at least one first reflective area can have a diffractive structure.

A reflective area embodied in the form of a diffractive structure is advantageous in that only minimal changes need to be carried out at the cantilever of the measuring probe. Therefore, the operating behaviour of the measuring probe is only modified slightly by the reflective area.

The diffractive structure can comprise at least one line grating and/or the at least one line grating can comprise a blazed grating.

As a result of embodying a line grating in the form of a blazed grating, it is possible to optimize the diffraction efficiency for the employed order of diffraction. Preferably, the first order of diffraction is used as second reflected light beam and optionally as third reflected light beam.

The diffractive structure can comprise at least two line gratings arranged rotated in relation to one another. The at least two line gratings may be arranged rotated in relation to one another by an angle of ±60° to ±120°, preferably ±65° to ±115°, more preferably ±70° to ±110°, and most preferably ±80° to ±100°. Further, the at least two line gratings may be oriented by an angle of ±45° relative to the cantilever longitudinal axis. The lattice constant of the at least two line gratings can be $\lambda/(2 \cdot \cos \theta)$, in which $\lambda$, specifies the wavelength of the employed light beams and $\theta$ denotes the angle of incidence thereof on the reflective area in respect of the surface normal.

Here and elsewhere in this application, the expression "substantially" denotes an indication of a measurement variable within its tolerances, with measuring appliances according to the prior art being used for the measurement.

The at least one reflective area and the at least one cantilever may have an integral embodiment. This embodiment facilitates the production of a reflective area during the production process of the cantilever. This ensures a cost-effective production of a reflective area. Moreover, the integral production of a reflective area dispenses with the need of the adjustment thereof in respect of the cantilever.

The at least one reflective area may comprise a dielectric reflection layer and/or a metal layer, for example an aluminium layer, silver layer or a gold layer, which is applied to the side, lying opposite the first measuring tip, of the at least one first cantilever and into which the diffractive structure has been introduced. The diffractive structure may be applied onto the at least one reflective area by lithography. Alternatively, it is also possible to produce the diffractive structure by mechanical processing of the reflective area.

The deposition of a reflective structure onto the top side of the cantilever is advantageous in that the reflection of the reflective area is high for the exposure wavelength of the interferometers. In another embodiment, the diffractive structure may be generated directly on the upper side of the cantilever.

Further, the apparatus can have a multi-segment photodiode embodied to detect, from one of the at least two reflected light beams, a tilt of the first measuring tip of the at least one first cantilever relative to the longitudinal axis of the cantilever and/or a twist of the free end of the at least one first cantilever.

The multi-segment photodiode may comprise a four-quadrant photodiode. Instead of the multi-segment photodiode, use can be made of an autocollimation telescope embodied to detect, from one of the at least two reflected light beams, a tilt of the first measuring tip of the at least one first cantilever relative to the longitudinal axis of the cantilever and/or a twist of the free end of the at least one first cantilever. Further, the function of the multi-segment photodiode may be replaced by at least two interferometers. Moreover, the measured tilt and/or the twist of the cantilever may also be used in the aforementioned calibration process.

Further, the apparatus can have at least one data processing apparatus embodied to determine a position of the first measuring tip of the scanning probe microscope in at least two spatial directions from measurement signals of the at least two first interferometers.

Further, the apparatus can have at least one scanning apparatus embodied to scan the at least one first measuring probe over a sample surface. Moreover, the at least one scanning apparatus can be embodied to use no feedback for the at least one cantilever during the scanning, at least in sections. The position of the measuring tip of the cantilever is measured directly in two or three spatial directions by use of two or more interferometers. Therefore, it is possible to dispense with feedback in respect of the z-position for the at least one first cantilever, at least in sections. As a result, it becomes possible to read the height of the measuring tip of the cantilever without having to wait for the closed-loop control to correct the z-position of the sample and/or of the measuring probe.

By virtue of the position of the measuring tip in respect of the sample surface not being determined within a closed feedback loop, scanning by use of the above-defined apparatus is not subject to the bandwidth limitation of a feedback loop and hence not subject to the restriction of the data recording speed accompanying this.

The scanning apparatus can be further embodied to adapt a lateral spacing between adjacent measuring points to a contour of the sample surface.

A substantial advantage of the scanning process as described here is that the individual measuring points for scanning a sample surface need not be placed at equidistant intervals. Instead, the spacing between the individual measuring points along the scanning line is adapted to the local contour of the sample surface in this region. As a result of this, it is possible to increase the precision of recording data, in particular in the case of samples with a large aspect ratio. The aspect ratio denotes the ratio of the height or depth of a structure to its (smallest) width.

Further, the apparatus can have at least one rotating apparatus embodied to rotate the at least one first measuring probe and a sample in relation to one another.

It is irrelevant whether the measuring probe, the sample or both the measuring probe and the sample are rotated.

The at least one measuring probe can be embodied to facilitate an installation, tilted toward the sample surface, of the at least one first measuring probe in a measuring head of the scanning probe microscope. The measuring probe may have, lying opposite the free end, a fastening region embodied to fasten the measuring probe in the measuring head of the scanning probe microscope.

The at least one first cantilever of the at least one first measuring probe can have a tilt angle in the range of 3° to 40°, preferably 4° to 35°, more preferably 5° to 30°, and most preferably 5° to 25° in relation to the sample surface.

Moreover, the apparatus can have a tilt apparatus embodied to tilt the at least one first cantilever relative to the sample surface.

By tilting the cantilever toward the sample surface, the angle of the measuring tip of the cantilever in respect of the local sample normal is reduced and the precision of scanning the sample surface with the measuring tip of the measuring probe is increased as a result thereof. Steep or overhanging walls of a sample surface can be measured in reproducible fashion using a tilted cantilever, in particular in conjunction with the relative rotation of the measuring probe in relation to the sample as well.

Moreover, the apparatus can have a calibration apparatus having at least one structure element embodied to determine a tilt angle for the at least one first cantilever.

With the aid of a calibration apparatus, it is possible to determine the tilt angle for the best possible scanning of a local contour of a sample for the measuring tip used by the measuring probe.

Further, the apparatus can have: (a) at least one second measuring probe having at least one second cantilever, the free end of which has a second measuring tip; and (b) wherein the at least one first measuring probe and the at least one second measuring probe are not arranged parallel to one another.

Moreover, the apparatus can have: (a) at least one second measuring probe having at least one second cantilever, the free end of which has a second measuring tip; (b) at least one second reflective area arranged in the region of the free end of the at least one second cantilever and embodied to reflect at least two light beams in different directions; (c) at least two second interferometers embodied to use the at least two light beams reflected by the at least one second reflective area to determine the position of the second measuring tip; and (d) wherein the at least one first measuring probe and the at least one second measuring probe are not arranged parallel to one another.

Consequently, the second measuring probe can be a conventional measuring probe which operates on any one of the known modes of operation of a measuring probe of a scanning probe microscope. However, in a second embodiment, it is possible to equip the second measuring probe with a reflective area according to the invention, on which the light beams originating from two or more interferometers are incident.

Rotating the measuring probe and/or the sample is a mechanically complicated process and performing this requires some time. Using a second measuring probe, it is possible to significantly reduce the number of necessary rotations between a sample and a measuring probe for the purposes of scanning a sample surface with a large aspect ratio.

Further, the apparatus can have an objective through which the at least two light beams incident on the at least one first reflective area, the at least two light beams reflected by the first reflective area, the at least two light beams incident on the at least one second reflective area, and the at least two light beams reflected by the second reflective area pass.

Further, the at least one scanning apparatus can be embodied to adjust a first spacing between adjacent first measuring points of the first measuring tip of the first measuring probe and a second spacing between adjacent second measuring points of the second measuring tip of the second measuring probe independently of one another. This increases the flexibility when scanning parts of a sample surface with a large aspect ratio.

The at least one first measuring probe and the at least one second measuring probe can be arranged substantially in antiparallel fashion or substantially rotated by 90° in relation to one another.

Further, the apparatus can have: (a) at least one further measuring probe having at least one further cantilever, the free end of which has a further measuring tip; (b) at least one further reflective area arranged in the region of the free end of the at least one further cantilever and embodied to reflect at least two light beams in different directions; and (c) at least two further interferometers embodied to use the at least two light beams reflected by the at least one further reflective area to determine the position of the further measuring tip.

The at least one first measuring probe, the at least one second measuring probe and the at least one further measuring probe may be arranged with equidistant angular intervals between one another.

A configuration with three measuring probes having an angle of 120° in relation to one another, the measuring tips of the measuring probe being adjacent to one another in such configuration, may represent a compromise between the outlay necessary to construct such a configuration and the speed and accuracy when recording data that is obtainable therewith. This applies, in particular, when examining atomic or molecular structures, or biological material.

An embodiment with four measuring probes having an angle of substantially 90° in relation to one another, in a cross-shaped arrangement, is adapted to the structure of many samples from semiconductor technology and it is therefore expedient for analyzing semiconductor structures and/or photolithographic masks.

Moreover, the apparatus can have an objective through which the at least two light beams incident on the at least one first reflective area, the at least two light beams reflected by the first reflective area, the at least two light beams incident on the at least one second reflective area, the at least two light beams reflected by the second reflective area, the at least two light beams incident on the at least one further reflective area, and the at least two light beams reflected by the further reflective area pass.

The at least one tilt apparatus can be embodied to tilt the at least one first measuring probe, the at least one second measuring probe, and the at least one further measuring probe independently of one another. The at least one scanning apparatus can be embodied to scan the at least one first measuring probe, the at least one second measuring probe, and the at least one further measuring probe sequentially over a sample surface. Moreover, the at least one scanner apparatus can be embodied to adjust a first spacing between adjacent measuring points of the first measuring tip of the at least one first cantilever, a second spacing of adjacent measuring points of the second measuring tip of the at least one second cantilever, and at least one further spacing between the measuring points of the further measuring tip of the at least one further cantilever independently of one another.

The first measuring tip of the at least one first cantilever, the second measuring tip of the at least one second cantilever, and the further measuring tip of the at least one further cantilever may have a spacing of <100 µm, preferably <50 µm, more preferably <30 µm, and most preferably <10 µm from one another Moreover, the apparatus can have a data processing apparatus embodied to determine a position of the first measuring tip of the scanning probe microscope, the position of the second measuring tip of the scanning probe microscope, and the position of the further measuring tip of the scanning probe microscope in at least two spatial directions from measurement signals of the at least two first interferometers, from measurement signals of the at least two second interferometers, and from measurement signals of the at least two further interferometers.

Further, the data processing apparatus can comprise at least one algorithm embodied to determine the position of the first measuring tip in two spatial directions from the measurement signals of the at least two first interferometers and/or the position of the first measuring tip in three spatial directions from the measurement signals of three interferometers, and wherein the at least one algorithm is embodied in hardware or a combination of hardware and software.

The fastening region of the at least one first cantilever, the fastening region of the at least one second cantilever, and the fastening region of the at least one further cantilever can have an integral embodiment. The fastening region of the at least one first cantilever, the at least one first cantilever, the fastening region of the at least one second cantilever, the at least one second cantilever, the fastening region of the at least one further cantilever, and the at least one further cantilever can have an integral embodiment. The fastening region of the at least one first cantilever, the at least one first cantilever, the first measuring tip of the at least one first cantilever, the fastening region of the at least one second cantilever, the at least one second cantilever, the second measuring tip of the at least one second cantilever, the fastening region of the at least one further cantilever, the at least one further cantilever, and the further measuring tip of the at least one further cantilever can have an integral embodiment.

According to a further exemplary embodiment, the problem explained above is solved by a method for examining a sample surface with a scanning probe microscope. The method for examining a sample surface with a scanning probe microscope includes the steps of: (a) directing at least one first light beam from at least one first interferometer onto at least one first reflective area arranged in the region of a free end of the at least one first cantilever which has a first measuring tip; (b) directing at least one second light beam from at least one second interferometer onto the at least one first reflective area arranged in the region of the free end of the at least one cantilever, wherein the at least one first reflective area reflects the at least one first light beam and the at least one second light beam in different directions; and (c) using the at least one first light beam reflected by the at least one first reflective area and the at least one second light beam reflected by the at least one first reflective area for the purposes of examining the sample surface.

In this application, an interferometer denotes the passive components of an interferometer, i.e. without a light source and without a reflective area applied to a cantilever, said reflective area acting as a reflective element for two or more light beams originating from two or more interferometers.

The method can include the step of: scanning a sample surface with the first measuring tip of the at least one first cantilever.

Further, the method can include the step of: scanning the at least one first cantilever over the sample surface, at least in sections, without using feedback by use of at least one first scanning apparatus.

Further, the method can include the steps of: (d) installing the at least one first measuring probe at a tilt in the measuring head of a scanning probe microscope; and (e) scanning with the tilted first cantilever by way of the at least one first scanning apparatus.

Further, the method can include the steps of: (f) tilting the at least one first cantilever relative to the sample surface by at least one first tilt apparatus; and (g) repeating the scan with the tilted first cantilever using the at least one first scanning apparatus.

Furthermore, the method can include the step of: correlating measurement data from the scan with and without a tilt of the at least one first cantilever.

Moreover, the method can include the steps of: (h) carrying out a rotation of the at least one first cantilever and a sample relative to one another; and (i) repeating the scan in the tilted state of the at least one first cantilever over the sample surface.

In addition, the method can include the step of: correlating measurement data of the scan with and without rotation. In addition, the method can include the step of: correlating measurement data of the scan of at least one first tilted cantilever and the scan of at least one second tilted cantilever over a sample surface, wherein the at least one first cantilever and the at least one second cantilever are not arranged parallel to one another.

In another aspect, a computer program comprises instructions that, when they are executed by an apparatus according to one of the aspects specified above, prompt the apparatus to perform the method steps of one of the above-described methods.

According to a further exemplary embodiment, the problem explained above is solved by a method for adapting scan parameters of at least one first measuring probe of a scanning probe microscope to a sample to be examined. The method for adapting scan parameters of at least one first measuring probe of a scanning probe microscope to a sample to be examined includes the steps of: (a) obtaining first data of a sample to be examined; (b) determining a variable for describing a contour of at least one portion of a sample surface of the sample to be examined from the first data; and (c) determining a spacing between adjacent measurement points of the at least one measuring probe of the scanning probe microscope from the determined variable.

Determining the variable for describing the contour can comprise: forming one or more local gradients of the at least one portion of the sample surface.

Further, determining the variable for describing the contour can comprise a tilted installation of at least one first cantilever in a measuring head of a scanning probe microscope. Moreover, determining the variable for describing the contour can comprise: tilting the at least one first cantilever, which has a first measuring tip at its free end, of the at least one measuring probe depending on the determined variable for a second measurement.

In addition, the method can include: determining a tilt angle for the installation of a tilted cantilever in a measuring head of the scanning probe microscope, and/or determining a tilt angle for at least one first tilt apparatus depending on the determined variable.

Further, the method can include the step of: rotating the at least one measuring probe relative to the sample in a manner dependent on the determined variable for a further measurement. Moreover, the method can include the step of: determining an angle of rotation for the at least one measuring probe in a manner dependent on the determined variable.

The at least one measuring probe can comprise at least one first measuring probe and at least one second measuring probe, and further include the step of: determining the measuring probe suitable for scanning over the sample surface to be examined from the determined variable.

The first data can be obtained from a database, in which design data of the sample to be examined are stored.

The first data can be obtained from a scan of the at least one measuring probe over the sample surface with a constant spacing between adjacent measurement points. The first data can be obtained from a scan of the at least one first measuring probe without a tilt of the cantilever of the at least one measuring probe. Further, the first data can be determined from design data in combination with the scan of the at least one measuring probe without a tilt of the cantilever.

Finally, in a further aspect, a computer program comprise instructions that, when executed by a computer system, prompt the computer system to carry out the method steps of one of the aspects specified above. The computer system can comprise a data processing apparatus of the above-defined apparatus.

DESCRIPTION OF DRAWINGS

The following detailed description describes currently preferred exemplary embodiments of the invention, with reference being made to the drawings, in which:

FIG. 20 has a flowchart of a method for examining a sample surface with a scanning probe microscope; and FIG. 21 presents a flowchart of a method for adapting scan parameters of a measuring probe of a scanning probe microscope to a sample to be examined.

DETAILED DESCRIPTION

Figure 1:
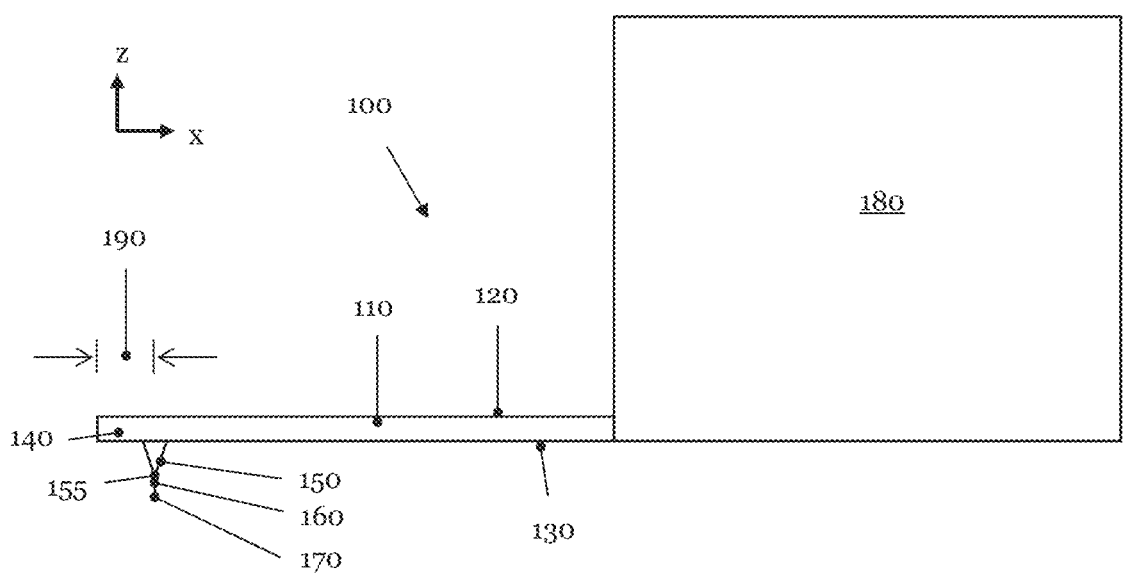
FIG. 1 shows a section through a schematic illustration of a measuring probe.
Figure 2:
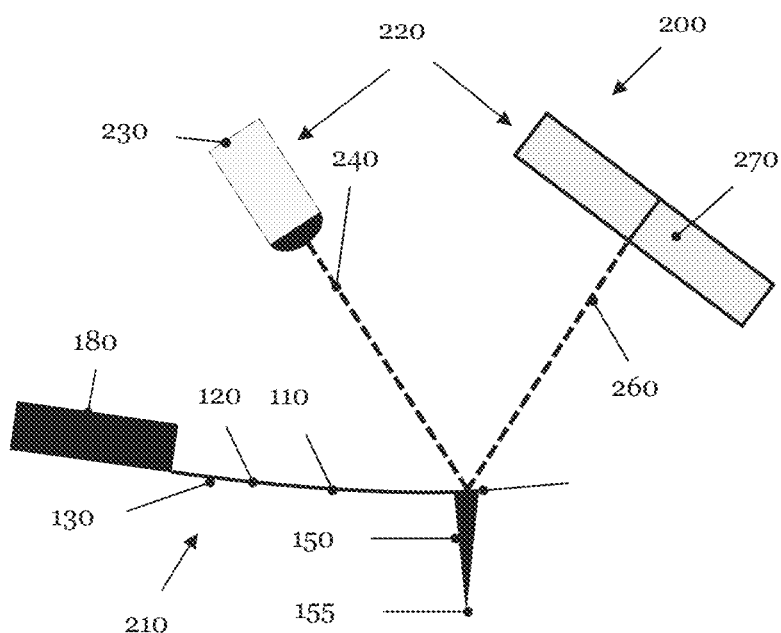
FIG. 2 reproduces a schematic illustration of a measuring probe and a light-pointer system according to the prior art.
Figure 3:
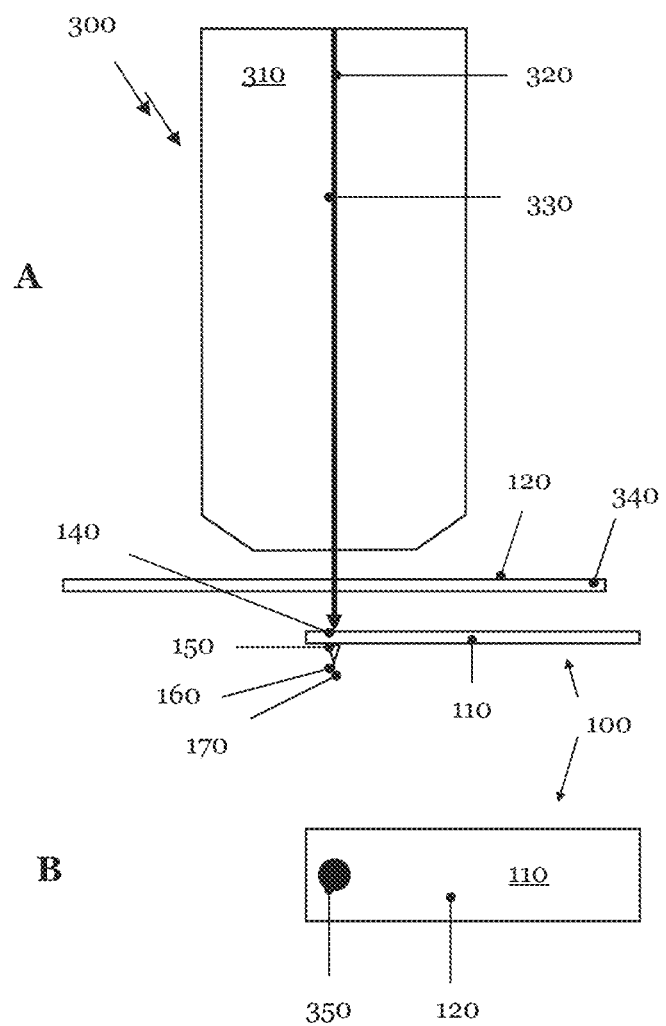
FIG. 3 shows, in partial image A, a section through a schematic representation of an objective of a glass plate and a measuring probe and specifies, in partial image B, a top view of the cantilever of the measuring probe of partial image A.

Some difficulties of conventional scanning probe microscopes are touched upon briefly on the basis of FIGS. 1 to 3. Following that, currently preferred embodiments of an apparatus according to the invention and of methods according to the invention will be explained in greater detail.

FIG. 1 shows a longitudinal section through a schematic illustration of a measuring probe 100. The measuring probe 100 comprises a bending beam, a spring beam or a cantilever 110. An exemplary cantilever 110 has a length (x-direction) of approximately 20 μm and a width (y-direction) of approximately 10 μm. The cantilever 110 has an upper side 120 or a front side 120 and a lower side 130 or a rear side 130. A cantilever 110 can be produced from a semiconductor material, for example silicon, a compound semiconductor, for instance silicon nitride, or a metal.

At the right end of the cantilever 110, the latter is connected to a fastening region 180, a fastening plate 180 or a handle chip 180. The fastening region 180 preferably has dimensions in the region of a few millimeters in all three spatial directions. Often, the fastening region 180 and the cantilever 110 of the measuring probe 100 are produced in integral fashion such that the fastening region 180 and the cantilever 110 have substantially the same material composition. The measuring probe 100 is fastened to a holder of a measuring head of a scanning probe microscope (not illustrated in FIG. 1) with the aid of the fastening region 180. This can be effectuated by clamping, for example.

A measuring tip 150 is applied to the lower side 130 of the cantilever 110 in the region of the free end 140 of the cantilever 110. The measuring tip 150 may be an integral constituent part of the cantilever 110. In this embodiment, the material compositions of the measuring tip 150 and of the cantilever 110 are substantially the same. The measuring tip 150 may also be produced as an independent unit and may be connected to the cantilever 110. In a manner similar to the cantilever 110, the measuring tip 150 may be manufactured from a semiconductor material, a compound semiconductor or from a metal or a metal alloy.

A long thin tip 160, which is referred to as a "whisker" may additionally be applied to the lower end of the measuring tip 150 or to the tip 155 of the measuring tip 150. Below, the long thin tip 160 is referred to by the technical term of whisker. By way of example, a whisker 160 may be produced from silicon, silicon nitride, silicon carbide, silicon dioxide and/or comprise a carbon nanotube, a modified carbon nanotube or a carbon structure deposited by an electron beam (electron beam deposited (EBD) carbon).

The tip 170 of the whisker 160 denotes the location to be determined when this application talks about determining a position of a measuring tip 150. If the measuring tip 150 does not have a whisker 160, the tip 155 of the measuring tip 150 denotes the location to be determined when determining the position of the measuring tip 150.

The spacing 190 denotes the distance of the tip 155 of the measuring tip 150, or the tip 170 of the whisker 160, from the free end 140 of the cantilever 110. As will be explained in the context of FIG. 3, the spacing 190 should be greater than the spot dimension of a light beam incident on the upper side 120 of the cantilever 110.

The diagram 200 of FIG. 2 shows a schematic longitudinal section through a measuring probe 210 with a cantilever 110, a fastening region 180 and a measuring tip 150 having a tip 155. Further, FIG. 2 reproduces a schematic longitudinal section through a light-pointer system 220. A light source 230 of the light-pointer system 220 radiates a light beam 240 onto the region 250 of the upper side 120 of the cantilever 110, the measuring tip 155 being attached to the rear side 130 of the cantilever 110 in said region. The light beam 240 is reflected by the upper side 120 of the cantilever 110 and incident on the multi-segment photodiode 270 as a reflected light beam 260. By way of example, the multi-segment photodiode 270 of the light-pointer system 220 may be a four-quadrant photodiode.

The multi-segment photodiode 270 detects a change in the curvature of the cantilever 110 caused by an interaction of the tip 155 of the measuring tip 150 with a sample. A closed-loop control compensates the detected change in the curvature of the cantilever 110 by moving the fastening region 180 of the measuring probe 210 or by moving the sample in the vertical direction, i.e. in the z-direction (not shown in FIG. 2). Consequently, the interaction between the sample surface and the measuring tip 150 is ascertained indirectly from the movement of the measuring probe 210 or of the sample.

Moving the measuring probe 210 or the sample for determining the position of the measuring tip 150 in a closed control loop is a time-consuming process. The data recording of the measuring probe 210 is limited by the bandwidth of the closed-loop control, which currently lies in the single-digit kHz range.

Partial image A of the diagram 300 in FIG. 3 shows a schematic section through a detection arrangement that—compared to the light-pointer system 220 of FIG. 2—facilitates faster data recording. In the detection arrangement illustrated in FIG. 3, use is made of an interferometer for determining the position of the tip 170 of the measuring tip 150. An interferometer, which is not shown in FIG. 3, ascertains the z-position of the tip 170 of the measuring tip 150 of the measuring probe 210, the fastening region of which has been suppressed in FIG. 3 and in the subsequent figures for reasons of clarity, from the reflected light beam 330.

An objective 310 directs a light beam 320 onto the upper side 120 of the free end 140 of the cantilever 110. The light beam 320 incident on the cantilever 110 and the reflected light beam 330 pass through a glass plate 340 that, in the example illustrated in the diagram of FIG. 3, separates the vacuum region of the measuring probe 100 from the ambient conditions at the objective 310. Partial image B presents a top view of the upper side 120 of the cantilever 110 of the measuring probe 210 and the focal spot 350 of the incident light beam 320. As already mentioned in the context of FIG. 1, a cantilever 110 often has a width of approximately 10 µm. The light beam incident on the cantilever 110 typically has a focal spot diameter FWHM (full width at half maximum) of a few micrometers, for instance 3 µm. The spacing of the center of the light beam from the free end 140 of the cantilever 110 should be greater than half the diameter of the focal spot, for example 3 µm for a focal spot diameter of 3 µm.

Determining the z-position of the measuring tip 150 is not subject to the bandwidth limitation of a closed control loop and consequently it is faster and more accurate than the light-pointer system sketched out in FIG. 2. Despite these advances, ascertaining the position of the measuring tip 150 still has an improvement potential in respect of the precision and speed of the data recording, in particular in respect of the lateral position of the measuring tip 150.

Figure 4:
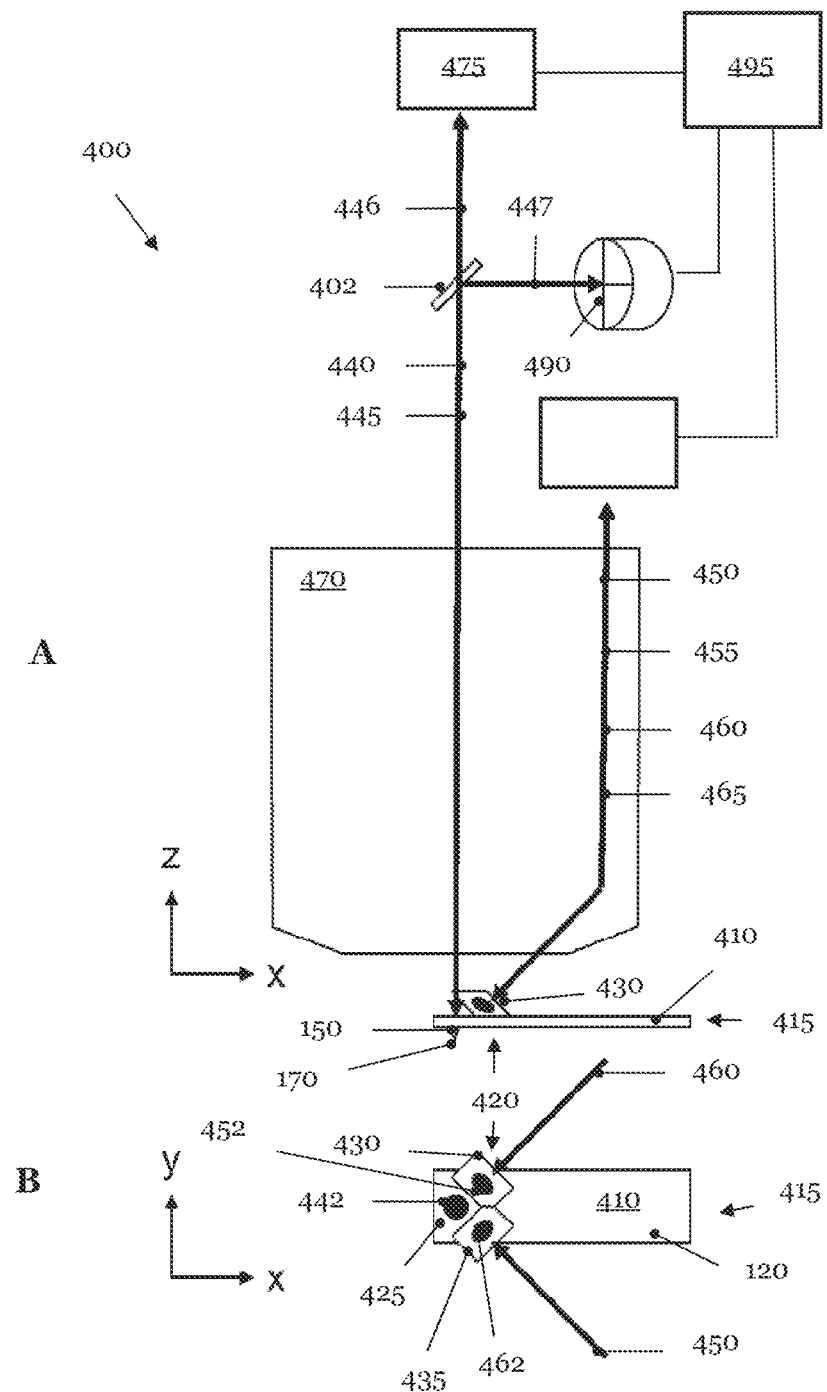
FIG. 4 reproduces, in partial image A, a schematic section through a few important components of an apparatus according to the invention and presents, in partial image B, a top view of a cantilever having an embodiment of a reflective area according to the invention in the form of three reflective portions.

FIG. 4 schematically shows some essential components of an exemplary embodiment of an apparatus 400 according to the invention. Partial image A presents a schematic longitudinal section and partial image B illustrate a top view of the upper side 120 of a cantilever 410 of a measuring probe 415. The upper side 120 of the cantilever 410 has a reflective area 420 according to the invention. In the example illustrated in FIG. 4, the reflective area 420 comprises a first reflective portion 425, a second reflective portion 430, and a third reflective portion 435. The first reflective portion 425 is arranged on the upper side 120 of the cantilever 410 of the measuring probe 415. The second reflective portion 430 and the third reflective portion 435 are arranged rotated through an angle α in relation to the longitudinal axis 510 of the cantilever 410. This is elucidated in partial image B of FIG. 5.

Figure 5:
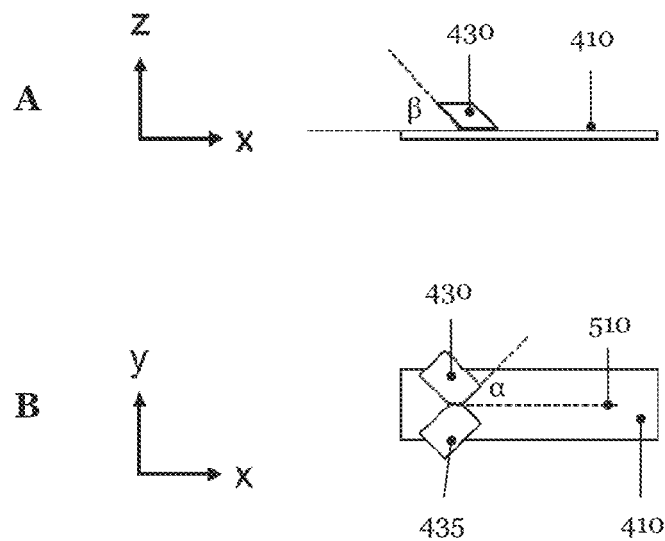
FIG. 5 elucidates, in partial image A, the definition of the angle β and, in partial image B, the definition of the angle α.

Partial image B of FIG. 5 shows an embodiment in which the second reflective portion 430 and the third reflective portion 435 are rotated through the angle α=±45° in relation to the longitudinal axis of the cantilever 410. As a result, the symmetry in relation to the longitudinal axis 510 of the cantilever 410 is maintained. Partial image A of FIG. 5 defines the angle β. It specifies the angle by means of which the second reflective portion 430 and the third reflective portion 435 are tilted out of the xy-plane in the z-direction, i.e. in relation to the normal of the first reflective portion 425. In the example presented in FIGS. 4 and 5, the following applies: β=45°.

Referring back to FIG. 4, the first reflective portion 425, the second reflective portion 430, and the third reflective portion 435 preferably have a high reflectivity in respect of the light beams used by the apparatus 400. In order to achieve this, the reflective portions 425, 430 and 435 preferably have a metal coating or a dielectric reflection coating if the reflective portions 425, 430 and optionally 435 do not have a metallic origin.

The first light beam 440 is incident on the first reflective portion 425 and it produces a focal spot 442 on the first reflective portion 425. The first light beam 440 is reflected by the first reflective portion 425 and passes through the objective 470 as a reflected first light beam 445 and is incident on the beam splitter 402. The first light beam 440 is adjusted on the first reflective portion in such a way that its center of maximum optical intensity lies over the tip 155, 170 of the measuring tip 150.

The beam splitter 402 divides the reflected first light beam 445 into two light beams 446, 447, preferably with the same intensity. The light beam 446 enters into the first interferometer 475 and is detected by the latter. The interferometer 475 transmits the generated measurement signal to the data processing apparatus 495. The data processing apparatus 495 determines the z-position of the tip 155, 170 of the measuring tip 150 from the measurement signal of the interferometer 475.

The light beam 447 is incident on the four-quadrant photodiode 490. The four-quadrant photodiode 490 fulfils two objects. Firstly, it serves to adjust the objective 470 in respect of the reflective area 420 of the cantilever 410. Secondly, the four-quadrant photodiode 490 facilitates the determination of a tilt of the measuring tip 150 of the cantilever 410 relative to the longitudinal axis 510 of the cantilever 410 and/or the determination of a torsion or a twist of the region of the cantilever 410 in which a reflective area 420 according to the invention is arranged relative to the fastening region 180 of the cantilever 410, and hence a movement of the tip 155, 170 of the measuring tip 150 in the y-direction. In a mode of operation of a scanning probe microscope in which the cantilever 410 of the measuring probe 415 is excited to vibrate, it is moreover possible to use the four-quadrant photodiode 490 to quickly detect contact between the measuring tip 150 and a sample on the basis of a reducing modulation amplitude.

A second light beam 450 from a second interferometer 480 likewise passes through the objective 470 and is incident on the second reflective portion 430, at an angle of 45° and in relation to the z-direction in the example of FIG. 4, and thereupon produces the focal spot 452. The second light beam 450 is adjusted on the second reflective portion 430 in such a way that its extension through the second reflective portion 430 would be incident on the tip 155, 170 of the measuring tip 150.

The light beam 455 reflected by the second reflective portion 430 passes through the objective 470 and enters the interferometer 480. The measurement signal produced by the interferometer 480 is likewise supplied to the data processing apparatus 495. The data processing apparatus 495 ascertains the z-position and a lateral position of the tip 155, 170 of the measuring tip 150 from the measurement signals of the two interferometers 480 and 485. The lateral direction is determined from the alignment of the second reflective portion 430 relative to the first reflective portion 425. This means that two reflective portions 425 and 430 are sufficient to determine a position of the tip 155, 170 of the measuring tip 150 in respect of the z-direction and a lateral direction, i.e. a direction in the xy-plane.

In the example illustrated in FIG. 4, a third interferometer 485 is used to direct a third light beam 460 onto the tip 170 of the measuring tip 150. In respect of the adjustment of the third light beam 460, the explanations provided above for the second light beam 450 apply. The selected angles α and β of the two interferometers 480 and 485 or their outgoing light beams 450, 455 (i.e. the light beams 450, 460 incident on the reflective portions 430 and 435) and the incoming light beams 460, 465 (i.e. the light beams 455, 465 reflected by the reflective portions 430, 435) coincide in the section of partial image A.

The light beam 460 of the third interferometer 485 is incident on the third reflective portion 435 and produces the focal spot 462. The light beam 465 reflected by the third reflective portion 435 passes through the objective 470 and is detected by the third interferometer 485. The measurement signal produced by the third interferometer 485 is guided to the data processing apparatus 495. For the exemplary configuration of the first reflective portion 425, the second reflective portion 430, and the third reflective portion 435 with α=β=45° for the second reflective portion 430 and α=−45° and β=+45° for the third reflective portion 435, as illustrated in FIG. 4, the directions of the beams 450 and 460 incident on the second reflective portion 430 and the third reflective portion 435 are given by:

$$\vec{B_{450}} = -\frac{1}{2} \cdot \vec{e_x} + \frac{1}{2} \cdot \vec{e_y} - \frac{1}{\sqrt{2}} \cdot \vec{e_z}$$

$$\vec{B_{460}} = -\frac{1}{2} \cdot \vec{e_x} - \frac{1}{2} \cdot \vec{e_y} - \frac{1}{\sqrt{2}} \cdot \vec{e_z}$$

The signs in respect of the spatial directions are inverted for the reflected beams 455 and 465. The data processing apparatus 495 can ascertain the position of the tip 155, 170 of the measuring tip 150 in three spatial directions from the measurement signals of the three interferometers 475, 480, and 485. In practice, the exact adjustment of the incident light beams 440, 450, and 460 on the measuring tip 150 is difficult; this may lead to measurement errors, particularly when determining the lateral position of the measuring tip 150. This problem may be exacerbated if the exact positioning of the measuring tip 150 relative to the cantilever 410 and the length of the measuring tip 150 are not exactly known.

At least two measures can be used to overcome these difficulties. Firstly, the position of the tip 155, 170 of the measuring tip 150 may be determined with the aid of a calibration measurement. The adjustment problem can be diffused by virtue of the signal of the multi-segment photodiode 490 being used to determine a curvature of the cantilever 410 in the z-direction. A curvature of the cantilever 410 leads to a movement of the tip 155, 170 of the measuring tip 150 in the x-direction. Further, the cantilever 410 may experience a twist or a torsion as a result of an interaction with a sample surface, leading to a movement of the tip 155, 170 of the measuring tip 150 in the y-direction. The measurement signal supplied by the multi-segment photodiode 490 can be used by the data processing apparatus 495 to ascertain a tilt and/or torsion of the free end 140 of the cantilever 410 and to take the latter into account when determining the lateral position of the tip 155, 170 of the measuring tip 150.

The objective 470 preferably has a numerical aperture (NA) in the range of 0.7 to 0.95. A large NA of the objective 470 only slightly restricts the beam guidance for the light beams 440, 450, and 460. The NA of the objective 470 must be large enough to be able to image the light beams 440, 450, 460 incident on the reflective area 420 and the reflected light beams 445, 455, 465. For a horizontally arranged cantilever 410 with at least one second reflective portion 430 arranged at the angle β=45°, the objective 470 must at least have an NA as follows: NA>sin(β)=sin 45°=0.71. Including a reserve for the divergence of the light beams 440, 445, 450, 455, 460, 465, the objective 470 should have an NA of 0.8 or more. From FIG. 14 below, it is possible to gather that tilting the cantilever 410 toward the sample surface reduces the required NA of the objective 470.

Precise quick, homodyne interferometers or heterodyne interferometers can be used as interferometers 475, 480, and 485. Expediently, the interferometers 475, 480, 485 use a wavelength in the visible range of the electromagnetic spectrum; this simplifies the adjustment of the apparatus 400. By way of example, a helium-neon laser that emits at a wavelength of 633 nm can be used as a light source for the interferometers 475, 480, and 485. Alternatively, use can be made of a frequency doubled Nd-YAG (neodymium-doped yttrium aluminum garnet) laser that emits coherent radiation at a wavelength of 532 nm.

Instead of the four-quadrant photodiode 490 illustrated in the example of FIG. 4 as an example of a multi-segment photodiode, an autocollimation telescope or a combination of at least two, preferably three interferometers can be used in the apparatus 400 for determining a curvature of the cantilever 410 and/or a twist of the cantilever 410, i.e. ascertaining a movement of the tip 155, 170 of the measuring tip 150 in the xy-plane.

The data processing apparatus 495 has one or more algorithms that the data processing apparatus 495 can use to calculate the position of the tip 155, 170 of the measuring tip 150 from the measurement signals of the interferometers 475, 480, and 485. The algorithm or the algorithms can be embodied in the form of hardware, software, firmware or a combination thereof.

Figure 6:
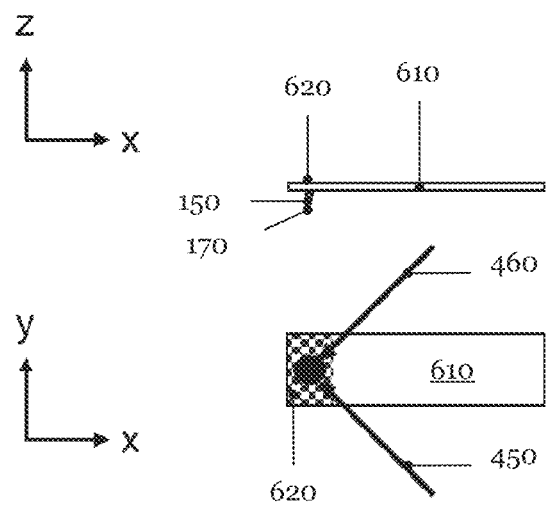
FIG. 6 illustrates a schematic illustration of a reflective area embodied in the form of a diffractive optical element.

The production of a reflective area 420 in the form of two reflective portions 425 and 430 or three reflective portions 425, 430, and 435 is a complicated process. Therefore, an alternative embodiment of a reflective area 420 is described below. FIG. 6 presents a cantilever 610, the reflective area 420 of which has a diffractive structure 620.

Figure 7:
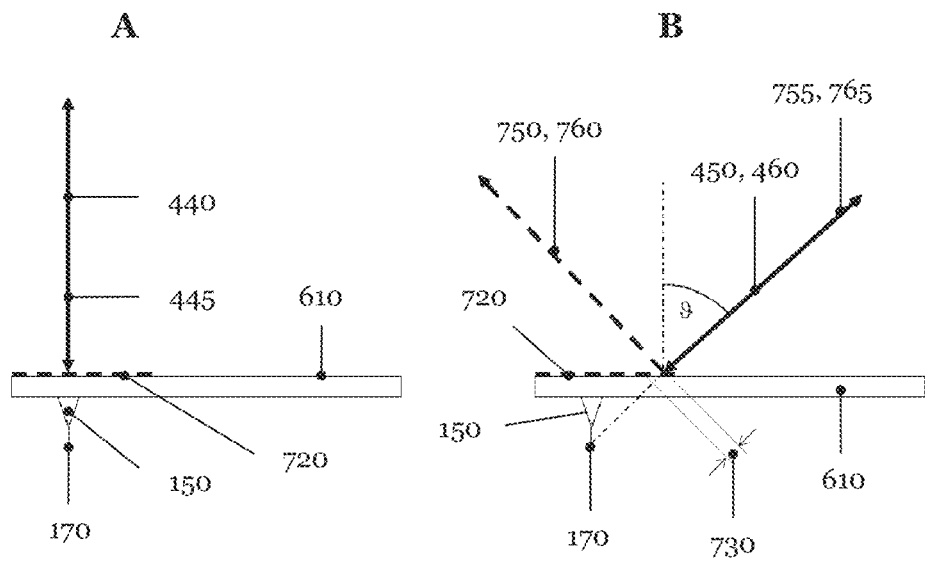
FIG. 7 presents a schematic section through a line grating designed such that radiation incident at an angle ϑ has an order of diffraction at this angle.

FIG. 7 presents a reflective structure 420, on a cantilever 610, embodied as a line grating 720. FIG. 7 elucidates the configuration designed for the light beams 440, 450, 460 incident on the grating 720 and the light beam 445 reflected by the grating 720 as well as a diffracted light beam of one order of diffraction to propagate substantially antiparallel in relation to one another. This means that the line grating 720 produces a reflected beam 445 and a diffracted beam 755, the beam path of which through the objective 470 is substantially identical to the beam path illustrated in FIG. 4. In this case, a measuring probe, the cantilever 610 of which has a diffractive structure 620 as a reflective area 420, can easily be interchanged in relation to a measuring probe 415, the cantilever 410 of which has a reflective area 420 embodied as two reflective portions 425, 430 or three reflective portions 425, 430, 435. Partial image A of FIG. 7 illustrates the light beam 440 incident on the line grating 720 in the z-direction and the light beam 445 reflected by the line grating 720. The reflected light beam 445 is reflected, but not diffracted, by the line grating 720.

As explained in the context of FIG. 4, the three light beams 440, 450, and 460 incident on the line grating 720 are advantageously adjusted in relation to one another in such a way that their extensions—indicated by the dashed line 780 in FIG. 7—intersect beyond the line grating 720 in the tip 155, 170 of the measuring tip 150. As a result, Abbe errors are largely avoided.

Partial image B of FIG. 7 elucidates the situation for the second light beam 450 and/or the third light beam 460 incident on the grating 720 at an angle of incidence 4. The line grating 720 has the lattice constant 730:

$$d = \frac{\lambda}{2 \cdot \cos \vartheta},$$

in which λ, denotes the wavelength of the employed light beam 450, 460. For an angle of incidence for the light beam 450, 460 of ϑ=45', the following emerges for the lattice constant 720:

$$d = \frac{\lambda}{\sqrt{2}}.$$

If this condition is satisfied, the light beam 450, 460 incident on the line grating 720 and the diffracted light beam 755, 765 of the first order of diffraction (more precisely, the −1st order of diffraction) propagate in parallel or antiparallel. The reflected light beam 750, 760 that is not diffracted is not used for determining the position of the tip 155, 170 of the measuring tip 150.

Figure 8:
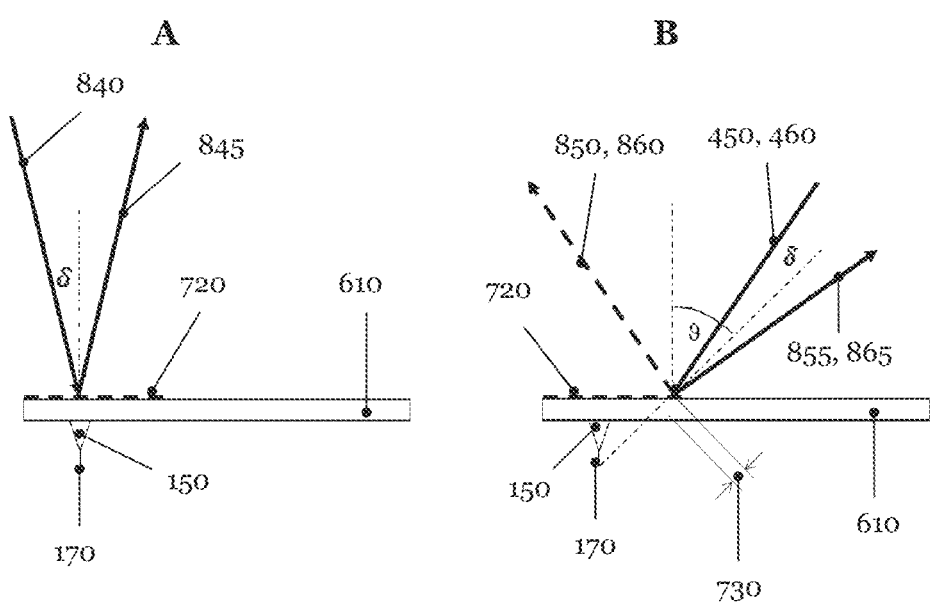
FIG. 8 reproduces the link grating of FIG. 7, in which light beams are incident at an angle δ and an angle ϑ−δ, and a light beam is reflected at the angle δ and a diffracted light beam occurs at the angle ϑ+δ.

FIG. 8 illustrates the production of the beams 845, 855, and 865 reflected by the line grating 720 should the incident light beam 840 and the reflected (not diffracted) light beam 845 have an angle ϑ in relation to the grating normal. The light beam 450, 460 incident on the grating 720 at the angle is diffracted at the angle ϑ+δ. As explained above, the reflected beam 850, 860 is not used to determine the position of the tip 170 of the measuring tip 150 of the cantilever 610. Instead, the light beam 855, 865 diffracted at the angle ϑ+δ, which, in a manner analogous to FIG. 7, denotes the −1st order of diffraction, is used by the interferometer 480, 485 for determining the (lateral) position of the measuring tip 150 or of the tip 155, 170 of the measuring tip 150.

Figure 9:
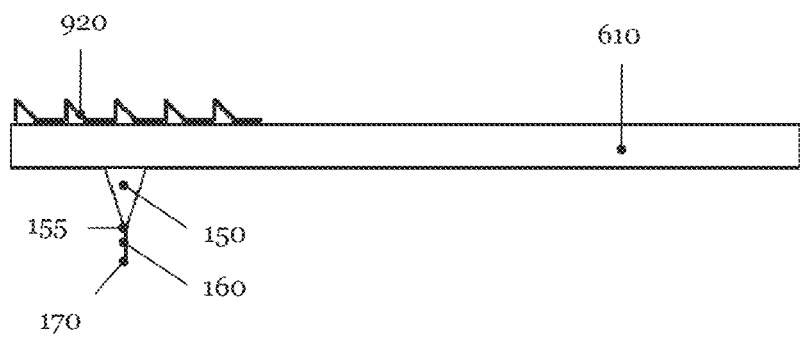
FIG. 9 specifies a section through a cantilever having a diffractive optical element in the form of a blazed-grating-like structure.

FIG. 9 presents a cantilever 610, the reflective area 420 of which has an embodiment similar to that of a blazed grating 920. The diffraction efficiency of the blazed grating 920 is optimized for the −1st order of diffraction. By virtue of less of the optical intensity of the light beams 450, 460 incident on the blazed grating 920 going into the reflected light beam 750, 760 or 850, 860, the objective 470 collects less unused radiation. However, what is more important is that the usable intensity of the −1st order of diffraction increases in comparison with the line grating 720 illustrated in FIGS. 7 and 8. The position of the measuring tip 150 in the z-direction and in a lateral dimension in the xy-plane can be ascertained with the aid of a line grating 720 or a blazed-grating-like structure 920.

Figure 10:
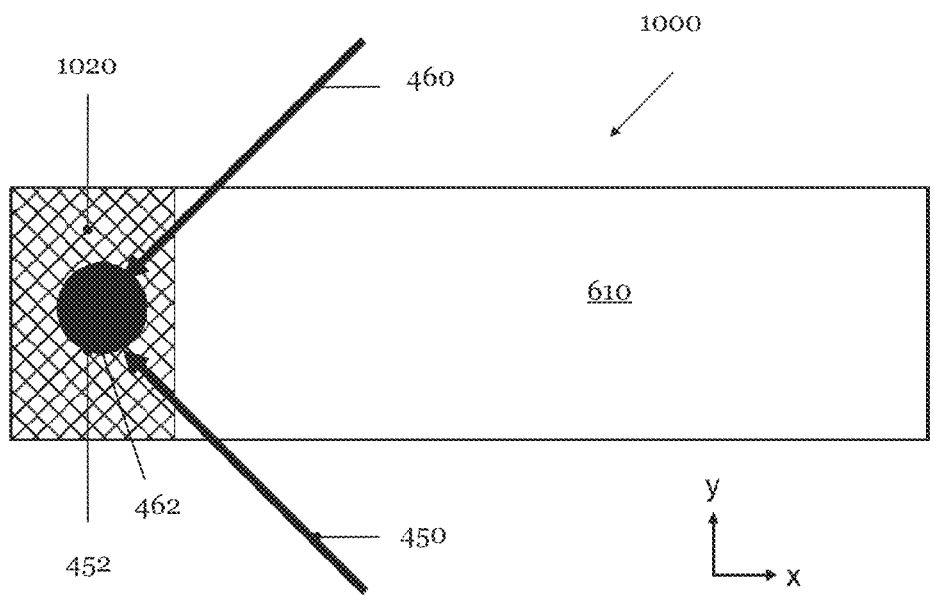
FIG. 10 illustrates a schematic top view of a cantilever having a reflective area in the embodiment of two line gratings rotated through 90°, said line gratings being rotated through an angle of 45° in relation to the longitudinal axis of the cantilever, having a focal spot originating from the three incident light beams.

FIG. 10 shows a cantilever 610 of a measuring probe 1000, the reflected area 420 of which has a crossed line grating 1020. The lines of the two line gratings 1020 are perpendicular to one another in the example illustrated in FIG. 10. The two lines of the crossed line grating 1020 are rotated by ±45° in relation to the longitudinal axis 510 of the cantilever. The incident second light beam 450 and the incident third light beam 460 are partly superposed on the crossed line grating 1020 in the focal spot 442 of the first light beam 440 that is incident perpendicularly, said first light beam being suppressed in FIG. 10 for reasons of clarity. Further, the fastening region 180 of the measuring probe 1000 has been omitted in FIG. 10.

If the interferometers 475, 480, and optionally 485 have parallel or antiparallel outgoing light beams 440, 450, and optionally 460 and incoming light beams 445, 455, and optionally 465, the cantilever 610 of the measuring probe 1000 in FIG. 10 can replace the cantilever 410 of the measuring probe 415 of FIG. 4 without causing much adjustment outlay.

However, it is not necessary for the two line gratings in the crossed line grating 1020 to be rotated by 90° in relation to one another. Rather, it is sufficient for the two line gratings forming the crossed line grating 1020 to be rotated in relation to one another through, for example, an angle of 45°, 60° or 75°. Further, it is not necessary for the light beams 440, 450, 460 incident on the crossed line grating 1020 and the reflected light beam 445 and the diffracted light beams 755, 765 to be parallel or antiparallel in relation to one another. A crossed line grating 1020 can also be used for the beam guidance explained in FIG. 8. Preferably, the line gratings of the crossed grating 1020 are embodied in the form of blazed-grating-like structures 920.

Figure 11:
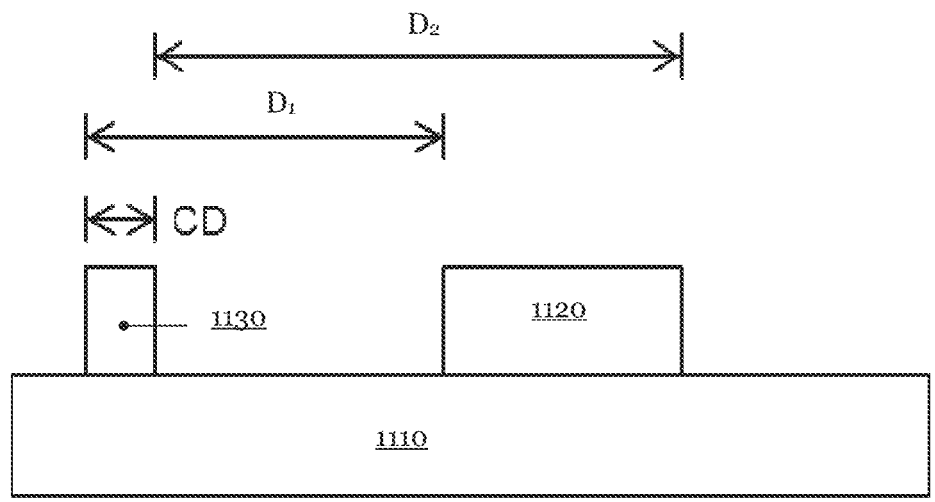
FIG. 11 presents a schematic section through a structure for determining a critical dimension (CD) of a structure element of a semiconductor structure or a photolithographic mask, and the spacing thereof from a marking.

FIG. 11 shows a schematic section through a structure 1100, on the basis of which the advantageous use of an apparatus 400 according to the invention is explained. By way of example, the structure 1100 may have a semiconductor structure or a photolithographic mask. The structure 1100 comprises a substrate 1110 on which a marking 1120 is applied. Further, the structure 1100 has a structure element 1130, the dimensions of which represent a critical dimension (CD) and should therefore be measured with the aid of a scanning probe microscope. The spacing $D_1$ denotes the distance of the left edge of the structure element 1130 from the left edge of the marking and the spacing $D_2$ describes the distance between the right edge of the structure element 1130 and the right edge of the marking 1120 of the structure 1100.

Figure 12:
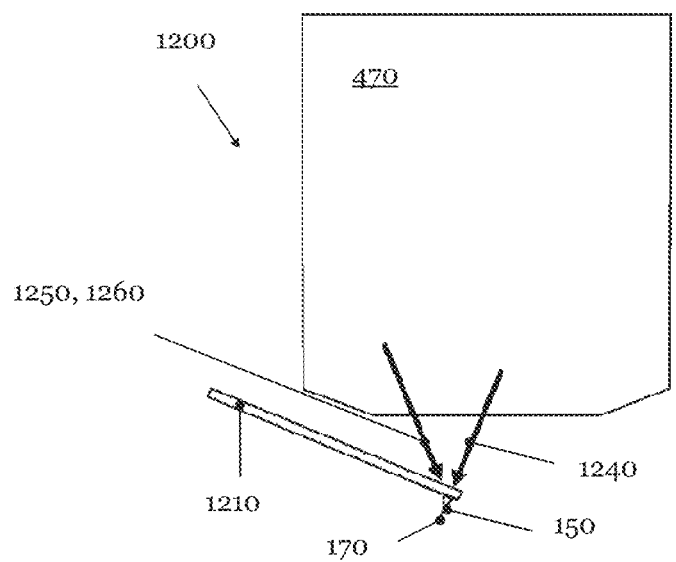
FIG. 12 illustrates a schematic section through a cantilever tilted toward the sample surface, said cantilever having a reflective area according to the invention.

FIG. 12 shows an apparatus 1200 that uses the objective 470 of the apparatus 400 and a cantilever 1210 with a measuring tip 150. The cantilever 1210 has a reflective area 420 according to the invention, in the form of reflective portions 425, 430 or 425, 430, 435 or in the form of a diffractive structure 620 in the form of a line grating 720, a blazed grating 920 or in the form of a crossed line grating 1020 (not illustrated in FIG. 12 or in the subsequent figures). In the example of FIG. 12, the cantilever 1210 is inclined in the direction toward the sample surface by an angle of substantially 22° in relation to the horizontal. Tilt angles in the range from 5° to 45° were found to be advantageous.

In order to attach a cantilever 1210 in a tilted state to a measuring head of a scanning probe microscope, the upper side of the fastening region 180 of the cantilever may have a wedge-shaped form such that the cantilever 1210 is tilted toward the sample surface after an installation of the corresponding measuring probe in the measuring head of the scanning probe microscope (not illustrated in FIG. 12). In a second embodiment, the receptacle of a measuring head assumes an oblique installation position such that, after the installation of the measuring probe, the cantilever 1210 thereof is inclined or tilted toward the sample (not shown in FIG. 12). Moreover, the use of a wedge-shaped structure together with a measuring probe in a measuring head of a scanning probe microscope is possible in a further embodiment. The last-mentioned exemplary embodiment is advantageous in that wedge-shaped structures can be kept available, said wedge-shaped structures having different wedge angles and being able to be inserted into a measuring head together with a measuring probe in a manner adapted to the sample to be examined. As a result, different tilt angles can be realized for the cantilever 1210 in a simple manner (not reproduced in FIG. 12).

The tilted or inclined cantilever 1210 can scan the surfaces of the substrate 1110 of the structure element 1130 and of the marking 1120 in a reproducible manner. The tilted cantilever 1210 is preferably used for scanning the substantially perpendicular right lateral surface of the structure element 1130 and for analyzing the likewise substantially perpendicular right side wall of the marking 1120 of the structure 1100. The cantilever 1210 or the measuring tip 150 thereof can scan these regions of the structure 1100 with a greater precision than a measuring probe whose cantilever has not been tilted.

For the purposes of scanning the left side walls of the structure element 1130 and of the marking 1120, the cantilever 1210 is rotated through substantially 180° in relation to the structure 1100. This can be achieved by rotating the structure 1100 about the z-axis, by rotating the cantilever 1210 about the z-axis or by a combined rotation of the structure 1100 and the cantilever 1210. According to the configuration rotated through 180°, the cantilever 1210 can be used to scan the left side walls of the structure element 1130 and of the marking 1120, illustrated in FIG. 11, in a reliable manner by way of the tilted cantilever 1210. The data processing apparatus 495 of FIG. 4 can produce a realistic contour of the structure 1100 from the measurement data of the two scans.

Figure 13:
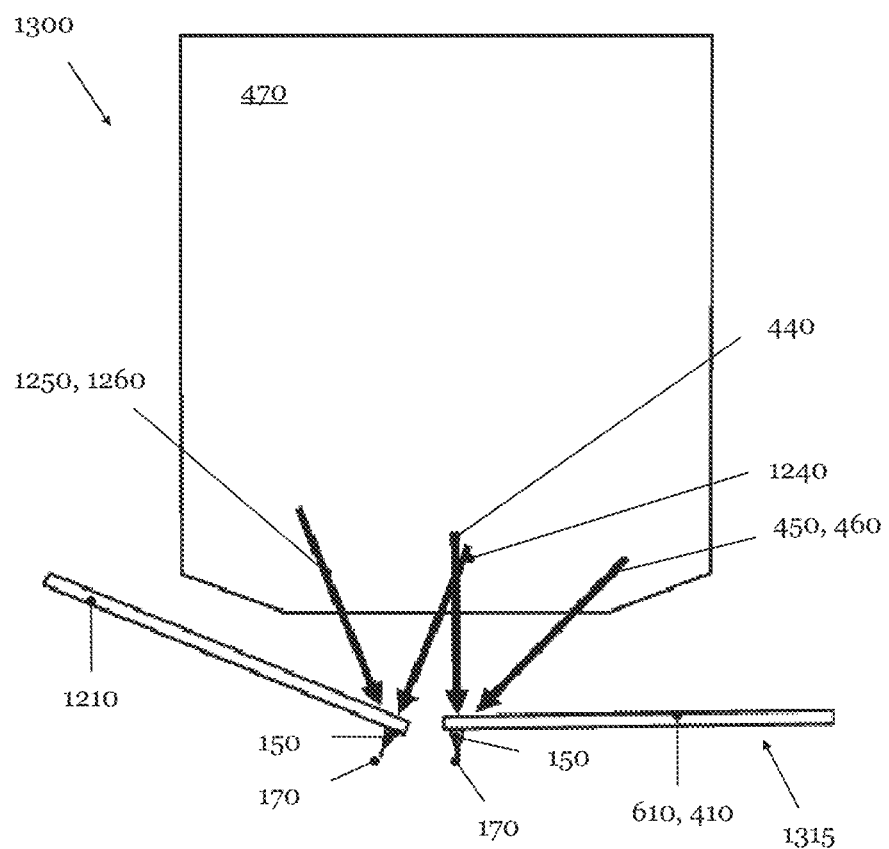
FIG. 13 shows FIG. 12 with a second cantilever not tilted toward the sample surface.

The apparatus 1300 of FIG. 13 shows the apparatus 1200 of FIG. 12 with a second cantilever 410, 610, which likewise has a reflective area 420 according to the invention. The second cantilever 410, 610 is not tilted toward the sample surface. In the example illustrated in FIG. 13, the cantilever 1210 and the cantilever 410, 610 have an antiparallel arrangement. However, this is not necessary for the functioning of the apparatus 1300. Instead, the two cantilevers 1210 and 410 or 610 may include any angle in relation to one another. Preferred angles are 0°, 60°, 90° and 180°.

The light beams 440, 450, and 460 incident on the reflective area 420 are indicated in FIG. 13. The second cantilever 410, 610 fulfils three objects. Firstly, it facilitates a fast overview scan of an unknown sample. Secondly, it facilitates greater precision when scanning the surfaces of the substrate 1110, the marking 1120 and the structure element 1130 as, in these regions, the sample normal and the measuring tip 150 of the cantilever 410, 610 for the exemplary structure 1100 illustrated in FIG. 11 are substantially parallel. Thirdly, the measuring tip 150 of the cantilever 410, 610 facilitates the scanning of the base of narrow deep trenches which cannot be reached by the measuring tip 150 of the tilted cantilever 1210 on account of the tilt.

In a second embodiment, not specified in FIG. 13, the second measuring probe 1315 may be replaced by a conventional measuring probe 100.

Figure 14:
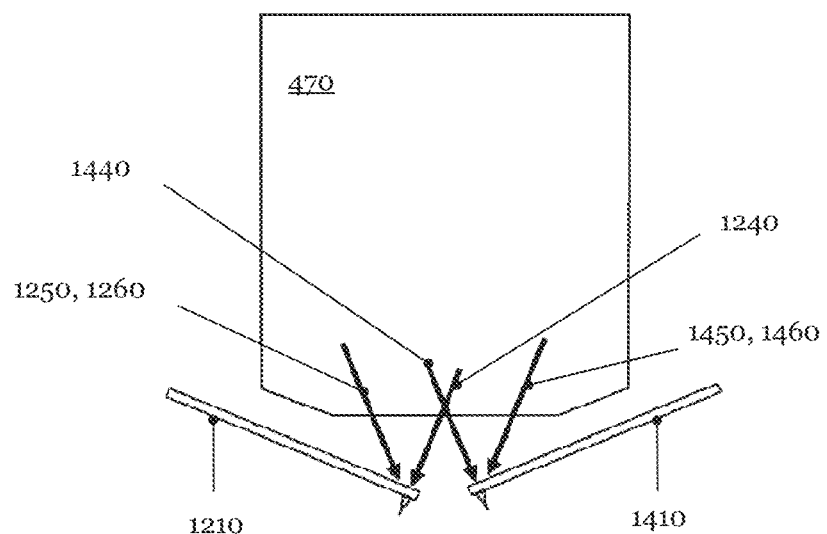
FIG. 14 shows FIG. 12 with two tilted cantilevers in an antiparallel arrangement.

The apparatus 1400 of FIG. 14 presents a configuration that comprises the apparatus 1200 of FIG. 12 and a second tilted cantilever 1410 in an antiparallel configuration in relation to the cantilever 1210. Both tilted cantilevers 1210 and 1410 have reflective areas 420 according to the invention. The light beams 1240, 1250, and optionally 1260 are incident on the reflective area 420 of the cantilever 1210 and the light beams 1440, 1450, and optionally 1460 are incident on the reflective area 420 of the cantilever 1410. The advantage of the apparatus 1400 lies in that a rotation for precisely scanning the left side walls and right side walls of the marking 1120 and the structure element 1130, and the problems with the apparatus 1400 accompanying this, can be avoided or at least significantly reduced. The light beams reflected by the reflective areas 420 of the cantilevers 1210 and 1410 are suppressed in FIG. 14 for reasons of clarity.

As already explained in the context of the discussion of FIG. 13, the one antiparallel arrangement of the cantilevers 1210 and 1410 is not mandatory for the functioning of the apparatus 1400. By way of example, the two cantilevers 1210 and 1410 have an angle of 90° in relation to one another in an alternative exemplary embodiment.

Figure 15:
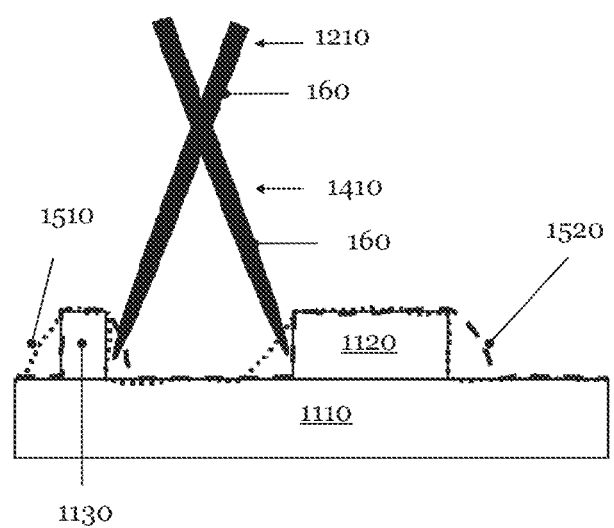
FIG. 15 schematically presents two scans with the configuration of FIG. 13 (i.e. with two tilted cantilevers) over the structure of FIG. 11.

FIG. 15 reproduces scans 1510 and 1520 of the two tilted cantilevers 1210 and 1410, or the measuring tips 150 with whiskers 160 thereof, over the substrate 1110, the marking 1120 and the structure element 1130 of the structure 1100 of FIG. 11. By tilting the cantilevers 1210 and 1410 toward the sample surface or toward the structure 1100 to be analyzed, the angle between the local sample normal and the measuring tip 150, or the whisker 160 on the measuring tip 150, is reduced and hence the accuracy is increased when scanning structures with steep side walls. The scan 1510 of the cantilever 1210 with the measuring tip 150 and the whisker 160 can precisely and reproducibly scan the right side walls of the marking 1120 and of the structure element 1130, whereas the scan of the left side walls of the marking 1120 and of the structure element 1130 is hardly possible and facilitates no reliable statements about these parts of the structure 1100. The statements in respect of the left and right side walls of the marking 1120 and of the structure element 1130 are interchanged for the scan 1520 of the whisker 160 of the cantilever 1410. Tilting a cantilever 1210 or 1410 improves the scan of the parts of the structure 1100 for which the measuring tip 150 or the whisker 160 is tilted toward the surface but reduces the resolution for the parts of the structure 1100 to be examined whose angle in relation to the sample normal is increased by the tilting of the cantilever 1210, 1410.

The data processing apparatus 495 can produce a realistic image of the structure 1100 from the measurement data of the scan 1510 of the right side walls of the marking 1120 and of the structure element 1130 by the cantilever 1210 and of the scan 1520 of the left side walls of the marking 1120 and of the structure element 1130 by the cantilever 1410. In particular, the width, thickness or the CD of the structure element 1130, and the height thereof (not illustrated in FIG. 11), can be ascertained from the data of the scans 1510 and 1520 of a scanning probe microscope over the structure 1100. Further, the spacing between the marking 1120 and the structure element 1130 can be calculated from the measured spacings $D_1$ and $D_2$. The application specified last can go without a calibration of the spacing of the measuring tips 150 of the cantilevers 1210 and 1410 to one another.

Figure 16:
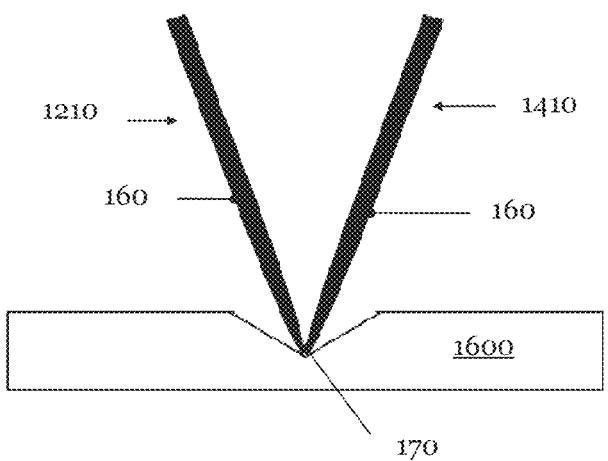
FIG. 16 reproduces a schematic section through a calibration apparatus for determining a lateral offset of two cantilevers.

FIG. 16 illustrates a schematic section through a calibration apparatus 1600. The calibration apparatus 1600 can be used to determine the arrangement of the measuring tip 150 on a cantilever 410, 610 or 1210, 1410 and the positioning of a whisker 160 on a measuring tip 150. Further, the calibration apparatus 1600 can be used to ascertain the spacing of the tip 155, 170 of the measuring tip 150 from the reflective area 420 of the cantilever 410, 610, 1210, 1410.

Figure 17:
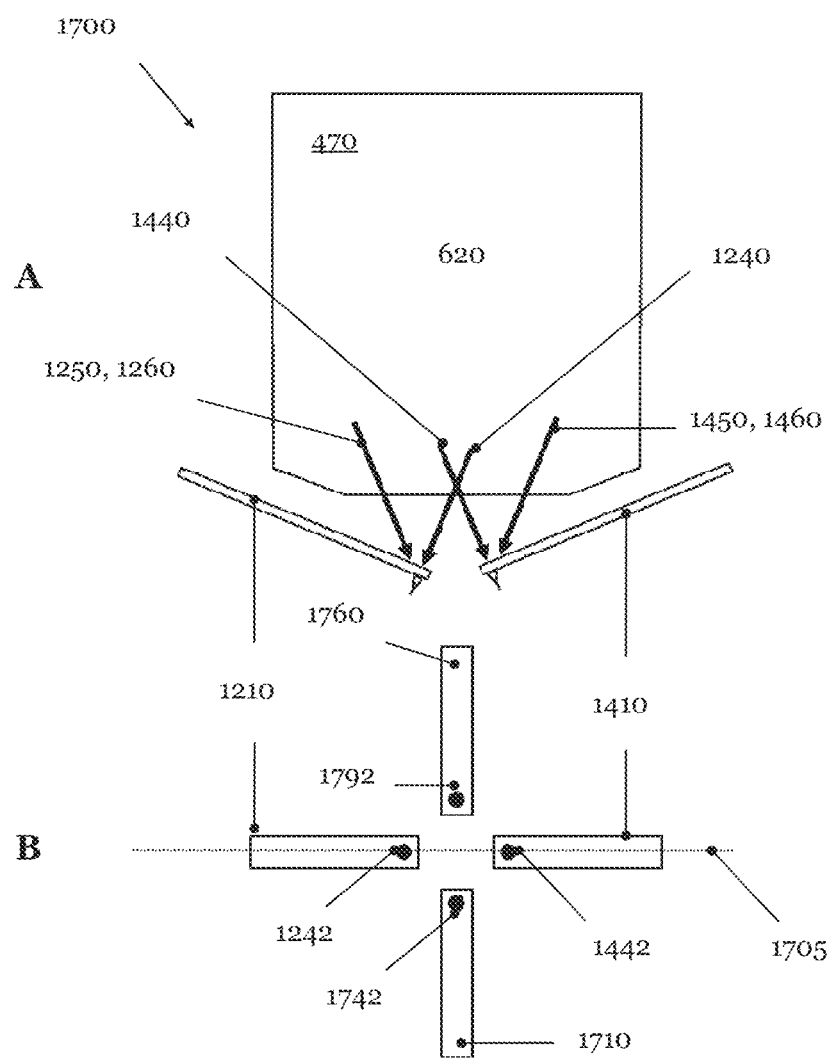
FIG. 17 reproduces, in partial image A, a section through a configuration having four crossed cantilevers and, in partial image B, a top view of the four crossed cantilevers.

The apparatus 1400 of FIG. 14 with two tilted cantilevers 1210 and 1410 in an antiparallel arrangement facilitates, for the two-dimensional structure 1100 of FIG. 11 (e.g. in the xz-plane), the avoidance of a rotation of cantilevers 1210 and 1410 in relation to a sample to be examined. The apparatus 1700 sketched out in FIG. 17 allows a precise examination of a three-dimensional structure without having to carry out a rotation between the cantilevers and the sample.

Partial image A shows a section along the line 1705 for the top view, indicated in partial image B, of a cross-shaped arrangement of four cantilevers 1210, 1410, 1710, and 1760. Each of the four cantilevers 1210, 1410, 1710, and 1760 has a reflective area 420. Partial image A presents the light beams 1240, 1250, and optionally 1260 incident on the reflective area 420 of the two first interferometers 475, 480 or three first interferometers 475, 480, 485 and the light beams incident on the reflective area 420 of two or three second interferometers. The second interferometers are not shown in FIG. 17.

Partial image B presents the focal spot 1242 of the first light beam 1240 incident on the cantilever 1210 from the first interferometer 475. The focal spots 1442, 1742, and 1792 belong to the light beams 1440, 1740, and 1790 incident perpendicularly on the reflective area 420. The two last-mentioned light beams are not illustrated in FIG. 17. The apparatus 1700 illustrated in FIG. 17 has up to twelve interferometers, which are not shown in FIG. 17 but used to ascertain the positions of the tips 155, 170 of the measuring tips 150 of the cantilevers 1210, 1410, 1710, and 1760. As explained in the context of FIG. 4, this can be effectuated, for example, by the data processing apparatus 495.

Figure 18:
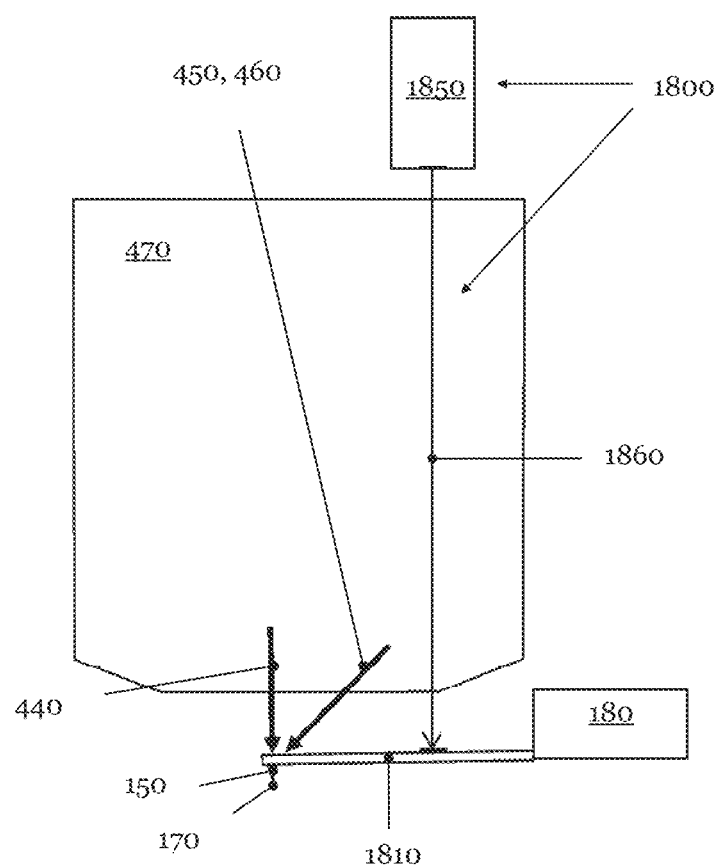
FIG. 18 shows a schematic section through an apparatus having a tilt apparatus.

FIG. 18 schematically presents a section through a cantilever 1810 that is tilted or bent temporarily by an actuator 1800. The cantilever 1810 has two layers with different material compositions (not illustrated in FIG. 18). In particular, the two layers have different (expediently very different) coefficients of thermal expansion. Further, the cantilever 1810 has a reflective area 420 according to the invention in the form of reflective portions 425, 430, and optionally 435 or a diffractive structure 620 in the form of a line grating 720, 920 or two crossed line gratings 1020. The reflective area 420 is irradiated through the objective 470 by the first light beam 440, the second light beam 450, and optionally the third light beam 460. The reflected light beams 445, 455, and optionally 465 are suppressed for reasons of clarity.

In the example illustrated in FIG. 18, the actuator 1800 or the tilt apparatus 1800 comprises a light source 1850. By way of example, it may be embodied as a laser system or as an LED (light-emitting diode). The light beam 1860 of the light source 1850 is steered through the objective 470 onto the cantilever 1810 in the vicinity of the fastening region 180. The absorbed photons heat the cantilever 1810 locally and bend the free end 140 of the cantilever 1810 in a defined manner toward the sample surface or away from the sample surface as a result of the different coefficients of thermal expansion of the two or more layers of the cantilever 1810. The bend of the cantilever 1810 can be adjusted via the intensity of the light beam 1860. The bend of the cantilever 1810 is reversed after switching off the irradiation of the cantilever 1810 by the light source 1850, and the free end 140 and hence the measuring tip 150 return to their initial state. This means that the cantilever 1810 can be used for scanning in a tilted state and in a non-tilted state over a sample or the structure 1100 of FIG. 11.

Instead of a light source 1850, an activatable tilt apparatus 1800 may comprise a resistive element that is applied to a cantilever or integrated in the latter (not shown in FIG. 18). The resistive element facilitates temporary bending of the cantilever in a reproducible manner by way of an adjustable current flow through the resistive element and hence facilitates tilting or bending of the measuring tip 150 of the cantilever relative to the longitudinal axis of the cantilever (the x-direction). A tilt apparatus 1800 may be integrated instead of a tilted cantilever 1210, 1410, 1710, and 1760, or additionally or alternatively, into the cantilevers 410, 610, 1210, 1410, 1710, 1760 of FIGS. 12-14 and 17.

The configuration presented in FIG. 18 may comprise a further non-tilted cantilever (not illustrated in FIG. 18). By way of example, the position of the measuring tip 150 of the further cantilever can be measured by a light-pointer system 220 and/or by one, two or three interferometers. By way of example, this further cantilever can take on one or more of the above-described problems (fast overview scan, scanning of deep trenches and/or precise measurement of planar areas or only slightly inclined areas of a sample).

Figure 19:
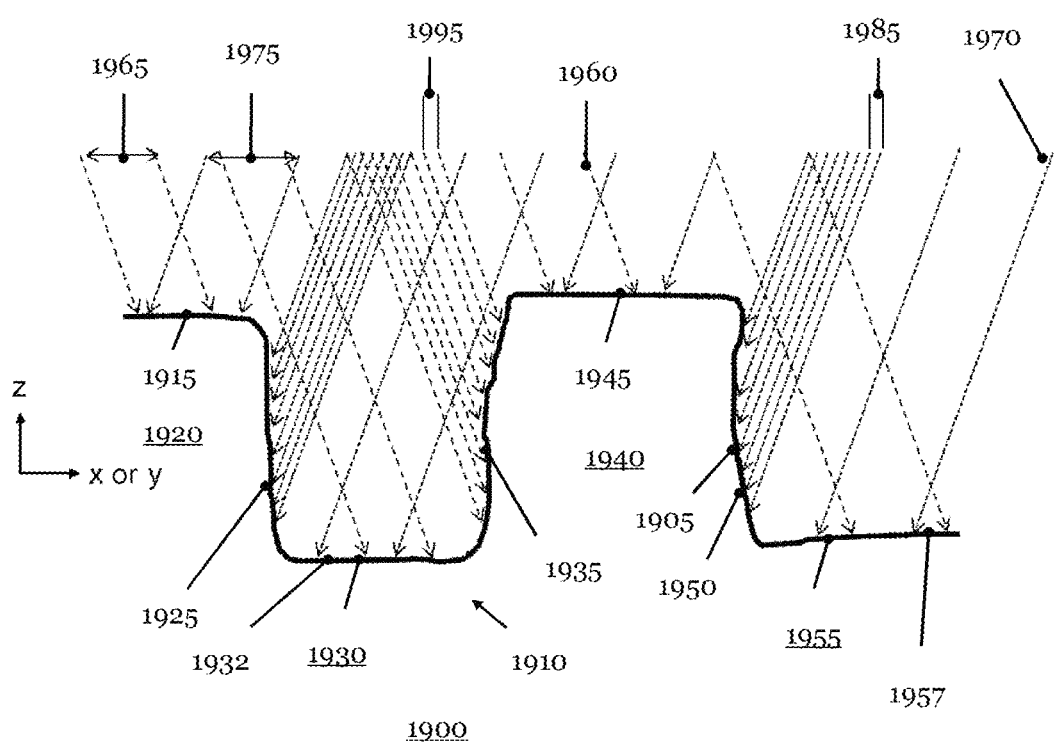
FIG. 19 illustrates a schematic section of a one-dimensional measuring point density of one of the configurations of FIG. 13 or 14, or 17 or 18, over a contour of a sample with very steep, perpendicular and overhanging flanks.

Some of the difficulties that occur when scanning a sample with a large aspect ratio or steep, perpendicular or even overhanging side walls were discussed in the context of FIGS. 13 to 15. Tilting the cantilever 1210, 1410, 1710, 1760 of a measuring probe toward the sample surface was explained as a means for overcoming or drastically reducing these difficulties. FIG. 19 presents a further aspect that facilitates reliable scanning of steep walls.

FIG. 19 shows a schematic section of a section of a sample 1900 with two step-shaped elevations 1920 and 1940, which are separated by a trench 1930. The two elevations have substantially planar surfaces 1915 and 1945 and the two trenches 1930 and 1955 likewise have substantially planar surfaces 1932 and 1957. The elevation 1920 has a steep smooth right side wall 1925. The second elevation 1940 has a steep rough left side wall 1935 and a steep, partly overhanging right side wall 1950. Overall, the contour 1910, and hence the sample surface 1905 of the sample 1900, has a large aspect ratio.

Scanning the contour 1910 of the sample 1900 with a measuring probe of a scanning probe microscope whose measuring tip 150 is oriented perpendicular to the surfaces 1915, 1932, 1945, and 1957 does not supply reliable measurement data in the region of the side faces 1925, 1935, and 1950. As explained in the context of FIG. 15, tilting the measuring tip 150 or the whisker 160 of a cantilever 1210 and 1410 before carrying out a scan 1510 and 1520 significantly improves the precision of the data recording.

Typically, the contour 1910 of the sample is scanned by virtue of, at equidistant spacing, the measuring tip 150 of a measuring probe being made to interact with the sample surface. The precision of the data recording of a scanning probe microscope can be significantly increased by virtue of the spacing at which the measurement points are set being adapted to the contour 1910 of the sample 1900 to be examined. This method can be applied independently of whether the cantilever 410, 610, 1210, 1410, 1710, 1760, 1810 is tilted or not tilted in relation to the surfaces 1915 and 1945.

FIG. 19 elucidates this procedure for two tilted cantilevers, for example the cantilevers 1210 and 1410 of FIG. 14. The dashed arrows 1960 specify the direction of the approach of the measuring tip 150 of the cantilever 1410 to the sample 1900. The dotted arrows 1970 symbolize the path of the approach of the measuring tip 150 of the cantilever 1210 to the surface 1905 of the sample 1900. The substantially planar surfaces 1915, 1932, 1945, and 1957 are scanned with a large spacing 1965 between adjacent measurement points by the measuring tip 150 of the cantilever 1410 and with a large spacing 1975 between two adjacent measurement points by the measuring tip 150 of the cantilever 1210. The spacings 1965 and 1975 between adjacent measurement points for the cantilevers 1210 and 1410 may be selected to have the same size or be different. Further, the spacings for all substantially planar faces 1915, 1932, 1945, and 1957 may be selected to be the same or different. Moreover, the spacings of the measuring points for the cantilever 1210 or 1410, the measuring tip 150 of which points away from the sample surface 1905 to be examined, may likewise be selected to be large, for instance like the spacing or spacings 1965, 1975 with which the planar surfaces 1915, 1932, 1945, and 1957 are scanned.

The one-dimensional measurement data density during a scan is significantly increased in the region of the steep side walls 1925, 1935, 1950 in which the measuring tip 150 of the cantilever 1210 or 1410 points toward the sample surface 1905. In FIG. 19, this is the case when the cantilever 1210 scans the right side wall 1925 of the first elevation 1920 with a one-dimensional measurement point density 1985. The right side wall 1950 of the second elevation 1940 can be scanned by the cantilever 1210 with the spacing 1985 between adjacent measurement points or with a similar spacing between adjacent measurement points. The left side wall 1935 of the second elevation 1940 is scanned by the measuring tip 150 of the cantilever 1410 with a one-dimensional measurement point density 1995. The spacings 1985 and 1995 between adjacent measurement points of the cantilevers 1210 and 1410 may be the same or different.

Moreover, the spacings between adjacent measurement points within the side walls 1925, 1935, and 1955 may vary or be selected to be constant.

The spacings between adjacent measuring points may be ascertained, for example, from the design data of the sample 1900. Then, the steepness of the side walls 1925, 1935, and 1950, as well as the height thereof, can be calculated from the design data. The spacings between adjacent measurement points along a scan 1510, 1520 can be calculated from these data by an algorithm that, for example, runs in the data processing apparatus 495 of the apparatus 400. By way of example, the local gradients of the contour 1910 can be ascertained from the design data. A one-dimensional density of the measurement data points along a scan 1510, 1520 can be calculated from the local gradients or from local gradients that are averaged over a region.

In an alternative embodiment, the data required for determining the location-dependent spacings 1965, 1975, 1985, and 1995 are recorded from an approximate overview scan or survey scan of the surface 1905 of the sample 1900. If it is easily possible, the overview scan is carried out using a non-tilted cantilever 410, 610, 810. However, an overview scan can also be carried out using one or more tilted cantilevers from the exemplary embodiments explained above.

Further, the best possible tilt angles for scanning the steep side walls 1925, 1935, 1950 can be determined from the local gradients. Moreover, the determined local gradients can be used to ascertain ideal angles of rotation of a cantilever in relation to the contour 1910 to be examined.

Determining the one-dimensional measurement point density may—as mentioned above—be carried out in the data processing apparatus 495 of the apparatus 400 or, externally, by the data processing apparatus 495.

FIG. 20 reproduces a flowchart 2000 of a method that can be used for examining a sample surface 1905, in particular a surface having a high aspect ratio and/or steep side walls 1925, 1935, and 1950. The method begins at 2010. In the first step 2020, at least one first light beam 440 is directed from at least one first interferometer 470 onto at least one first reflective area 420 arranged in the region of a free end 140 of the at least one first cantilever 410, 610, 1210, 1410, 1710, 1760, 1810, which has a first measuring tip 150. At the same time, in step 2030, at least one second light beam 450, 460 is directed from at least one second interferometer 480, 495 onto the at least one first reflective area 420 arranged in the region of the free end 140 of the first cantilever 410, 610, 1210, 1210, 1410, 1710, 1760, 1810, wherein the at least one first reflective area 420 reflects the at least one first light beam 440 and the at least one second light beam 450, 460 in different directions. In step 2040, the at least one second light beam 450, 460 reflected by the at least one first reflective area 420 and the at least one second light beam 450, 460 reflected by the at least one first reflective area 420 are used for the purposes of examining the sample surface 1905. The method ends at step 2050.

Finally, FIG. 21 presents a flowchart 2100 of a method that is used for adapting scan parameters of at least one measuring probe of a scanning probe microscope to a sample 1900 to be examined. The method begins in step 2110. In step 2120, first data of a sample 1900 to be examined are obtained. The data can be obtained from a database, in which the design data of the sample 1900 to be examined are stored. Alternatively, or additionally, first data may be obtained from an overview scan of the part of a sample 1900 to be examined. In step 2130, a variable for describing a surface contour 1910 of at least one portion of a sample surface 1905 of the sample 1900 to be examined is determined from the first data. In step 2140, a spacing between adjacent measurement points of the at least one measuring probe of the scanning probe microscope is determined from the determined variable. The method ends at step 2150.

What is claimed is:

1. An apparatus for a scanning probe microscope, having:
   a. at least one first measuring probe having at least one first cantilever, a free end of which has a first measuring tip;
   b. at least one first reflective area arranged in a region of the free end of the at least one first cantilever and embodied to reflect at least two light beams in different directions, wherein the at least one first reflective area comprises at least one first reflective portion and at least one second reflective portion, and wherein the first reflective portion and the second reflective portion are not arranged in a plane; and
   c. at least two first interferometers embodied to use the at least two light beams reflected by the at least one first reflective area to determine a position of the first measuring tip.

2. The apparatus according to claim 1, wherein the at least one first reflective area is arranged on a side, opposite the first measuring tip, of the at least one first cantilever.

3. The apparatus according to claim 1, wherein the at least one second reflective portion is arranged tilted by an angle $\beta$ in relation to the at least one first reflective portion and/or wherein the at least one second reflective portion is rotated through an angle $\alpha$ relative to a longitudinal axis of the cantilever.

4. The apparatus according to claim 1, further comprising: an objective through which the at least two light beams incident on the at least one reflective area pass.

5. The apparatus according to claim 1, wherein the at least one first reflective area has a diffractive structure.

6. The apparatus according to claim 5, wherein the diffractive structure comprises at least one line grating and/or wherein the at least one line grating comprises a blazed grating.

7. The apparatus according to claim 5, wherein the diffractive structure comprises at least two line gratings arranged rotated in relation to one another.

8. The apparatus according to claim 1, further comprising: a multi-segment photodiode embodied to detect, from one of the at least two reflected light beams, a tilt of the first measuring tip of the at least one first cantilever relative to the longitudinal axis of the cantilever and/or a twist of the free end of the at least one first cantilever.

9. The apparatus according to claim 1, further comprising: at least one scanning apparatus embodied to scan the at least one first measuring probe over a sample surface.

10. The apparatus according to claim 9, wherein the scanning apparatus is further embodied to adapt a lateral spacing between adjacent measuring points to a contour of the sample surface.

11. The apparatus according to claim 1, wherein the at least one first measuring probe is embodied to facilitate an installation, tilted toward a sample surface, of the at least one first measuring probe in a measuring head of the scanning probe microscope.

12. The apparatus according to claim 1, further comprising:
   a. at least one second measuring probe having at least one second cantilever, the free end of which has a second measuring tip; and
   b. wherein the at least one first measuring probe and the at least one second measuring probe are not arranged parallel to one another.

13. The apparatus according to claim 12, wherein the at least one first measuring probe and the at least one second measuring probe are arranged substantially in antiparallel fashion or substantially rotated by 90° in relation to one another.

14. The apparatus according to claim 12, further comprising:
   a. at least one further measuring probe having at least one further cantilever, a free end of which has a further measuring tip;
   b. at least one further reflective area arranged in a region of the free end of the at least one further cantilever and embodied to reflect at least two light beams in different directions; and
   c. at least two further interferometers embodied to use the at least two light beams reflected by the at least one further reflective area to determine a position of the further measuring tip.

15. The apparatus according to claim 14, further comprising an objective through which the at least two light beams incident on the at least one first reflective area, the at least two light beams reflected by the first reflective area, the at least two light beams incident on the at least one second reflective area, the at least two light beams reflected by the second reflective area, the at least two light beams incident on the at least one further reflective area, and the at least two light beams reflected by the further reflective area pass.

16. The apparatus of claim 1, wherein at least one of the at least one first portion or the at least one second portion of the at least one reflective area is a plane area.

17. A method for examining a sample surface with a scanning probe microscope, the method comprising the steps of:
   a. directing at least one first light beam from at least one first interferometer onto at least one first reflective area arranged in the region of a free end of at least one first cantilever, which has a first measuring tip, wherein the at least one first reflective area comprises at least one first reflective portion and at least one second reflective portion, and wherein the first reflective portion and the second reflective portion are not arranged in a plane;
   b. directing at least one second light beam from at least one second interferometer onto the at least one first reflective area arranged in the region of the free end of the at least one first cantilever, wherein the at least one first reflective area reflects the at least one first light beam and the at least one second light beam in different directions; and
   c. using the at least one first light beam reflected by the at least one first reflective area and the at least one second light beam reflected by the at least one first reflective area for the purposes of examining the sample surface.

18. A non-transitory computer-readable medium storing a computer program comprising instructions which, when they are executed by an apparatus for a scanning probe microscope, the apparatus comprising:
   a1. at least one first measuring probe having at least one first cantilever, a free end of which has a first measuring tip,
   b1. at least one first reflective area arranged in a region of the free end of the at least one first cantilever and embodied to reflect at least two light beams in different directions, wherein the at least one first reflective area comprises at least one first reflective portion and at least one second reflective portion, and wherein the first reflective portion and the second reflective portion are not arranged in a plane, and c1. at least two first interferometers embodied to use the at least two light beams reflected by the at least one first reflective area to determine a position of the first measuring tip, cause the apparatus to perform method steps comprising:

a2. directing at least one first light beam from at least one first interferometer onto the at least one first reflective area arranged in the region of the free end of the at least one first cantilever, which has the first measuring tip, wherein the at least one first reflective area comprises the at least one first reflective portion and the at least one second reflective portion, and wherein the first reflective portion and the second reflective portion are not arranged in a plane;

b2. directing at least one second light beam from at least one second interferometer onto the at least one first reflective area arranged in the region of the free end of the at least one first cantilever, wherein the at least one first reflective area reflects the at least one first light beam and the at least one second light beam in different directions, and c2. using the at least one first light beam reflected by the at least one first reflective area and the at least one second light beam reflected by the at least one first reflective area for the purposes of examining the sample surface.

* * * * *

UNITED STATES PATENT AND TRADEMARK OFFICE
CERTIFICATE OF CORRECTION

PATENT NO. : 11,237,185 B2
APPLICATION NO. : 16/586239
DATED : February 1, 2022
INVENTOR(S) : Ulrich Matejka and Christof Baur It is certified that error appears in the above-identified patent and that said Letters Patent is hereby corrected as shown below:

In the Specification

<u>Column 8</u>
Line 55, delete "another" and insert -- another. --

<u>Column 17</u>
Line 49, delete "4" and insert -- 9 --
Line 58, delete "45'," and insert -- 45°, --

Signed and Sealed this
Fourth Day of October, 2022

Katherine Kelly Vidal
*Director of the United States Patent and Trademark Office*